United States Patent
Zhan

(10) Patent No.: US 10,701,645 B2
(45) Date of Patent: Jun. 30, 2020

(54) RADIO FREQUENCY SIGNAL BOOSTER

(71) Applicant: CELLPHONE-MATE, INC., Fremont, CA (US)

(72) Inventor: Hongtao Zhan, Fremont, CA (US)

(73) Assignee: Cellphone-Mate, Inc., Fremont, CA (US)

( * ) Notice: Subject to any disclaimer, the term of this patent is extended or adjusted under 35 U.S.C. 154(b) by 0 days.

(21) Appl. No.: 16/401,902

(22) Filed: May 2, 2019

(65) Prior Publication Data

US 2019/0394734 A1     Dec. 26, 2019

Related U.S. Application Data

(63) Continuation of application No. 15/691,086, filed on Aug. 30, 2017, now Pat. No. 10,321,418.

(Continued)

(51) Int. Cl.
  *H04W 52/52* (2009.01)
  *H01Q 1/22* (2006.01)
  (Continued)

(52) U.S. Cl.
  CPC .......... *H04W 52/52* (2013.01); *H01Q 1/007* (2013.01); *H01Q 1/02* (2013.01); *H01Q 1/2291* (2013.01);
  (Continued)

(58) Field of Classification Search
  CPC ............... H04W 72/042; H04W 16/14; H04W 72/0413; H04W 88/08; H04W 84/12;
  (Continued)

(56) References Cited

U.S. PATENT DOCUMENTS 8,867,572 B1   10/2014   Zhan
9,065,415 B1   6/2015    Van Buren et al.
(Continued)

FOREIGN PATENT DOCUMENTS

EP            2077601 A1      7/2009
WO    WO 2010/002414 A1      1/2010
(Continued)

OTHER PUBLICATIONS

International Search Report and Written Opinion dated Dec. 6, 2017 in corresponding PCT Application No. PCT/US2017/049298, 11 pgs. (CELLP.037WO).
(Continued)

*Primary Examiner* — Keith Ferguson
(74) *Attorney, Agent, or Firm* — Knobbe, Martens, Olson & Bear, LLP

(57) ABSTRACT

An integrated signal booster system provides cellular and wireless local area network (WLAN) access within a single device. The integrated signal booster system includes at least one antenna integrated configured to receive a cellular uplink signal from user equipment (UE) of a cellular network and to transmit a boosted cellular downlink signal to the UE, signal booster circuitry configured to receive a cellular downlink signal from a cable and to send a boosted cellular uplink signal over the cable, and WLAN access point (AP) circuitry configured to control wireless communications with one or more wireless clients of a WLAN network. The signal booster circuitry is configured to generate the boosted cellular downlink signal based at least in part on amplifying the cellular downlink signal, and to generate the boosted cellular uplink signal based at least in part on amplifying the cellular uplink signal.

20 Claims, 21 Drawing Sheets

Related U.S. Application Data

(60) Provisional application No. 62/383,238, filed on Sep. 2, 2016, provisional application No. 62/425,833, filed on Nov. 23, 2016, provisional application No. 62/523,020, filed on Jun. 21, 2017.

(51) Int. Cl.
| | | |
|---|---|---|
| *H01Q 21/30* | (2006.01) | |
| *H04W 52/46* | (2009.01) | |
| *H04B 7/155* | (2006.01) | |
| *H01Q 1/00* | (2006.01) | |
| *H01Q 1/02* | (2006.01) | |
| *H01Q 1/24* | (2006.01) | |
| *H04L 27/00* | (2006.01) | |
| *H04W 84/12* | (2009.01) | |
| *H04W 88/10* | (2009.01) | |

(52) U.S. Cl.
CPC .......... *H01Q 1/246* (2013.01); *H01Q 21/30* (2013.01); *H04B 7/15535* (2013.01); *H04B 7/15542* (2013.01); *H04L 27/0002* (2013.01); *H04W 52/46* (2013.01); *H04W 84/12* (2013.01); *H04W 88/10* (2013.01)

(58) Field of Classification Search
CPC .......... H04W 52/52; H04W 72/1284; H04W 74/004; H04W 88/10; H04W 92/18
See application file for complete search history.

(56) References Cited

U.S. PATENT DOCUMENTS

| | | |
|---|---|---|
| 9,432,852 B2 | 8/2016 | Zhan et al. |
| 9,775,051 B2 | 9/2017 | Zhan |
| 2002/0155838 A1* | 10/2002 | Durrant .............. G01S 5/14 455/445 |
| 2004/0166802 A1 | 8/2004 | McKay, Sr. et al. |
| 2007/0001908 A1 | 1/2007 | Fager et al. |
| 2009/0323582 A1 | 12/2009 | Proctor, Jr. et al. |
| 2009/0325481 A1 | 12/2009 | Mohebbi |
| 2014/0134944 A1 | 5/2014 | Schwengler et al. |
| 2016/0301371 A1 | 10/2016 | Ashworth |
| 2016/0380665 A1 | 12/2016 | Lee et al. |
| 2017/0055231 A1* | 2/2017 | Cook .............. H04W 52/0229 |
| 2017/0093019 A1 | 3/2017 | Toh et al. |
| 2017/0111161 A1 | 4/2017 | Raggio et al. |
| 2017/0308250 A1 | 10/2017 | Schulz et al. |
| 2017/0366458 A1 | 12/2017 | Chan et al. |
| 2018/0034912 A1 | 2/2018 | Binder et al. |
| 2018/0070323 A1 | 3/2018 | Zhan |
| 2018/0139708 A1 | 5/2018 | Zhan |

FOREIGN PATENT DOCUMENTS

| | | |
|---|---|---|
| WO | 2016/049302 A1 | 3/2016 |
| WO | 2016/109561 A1 | 7/2016 |
| WO | 2017/215634 | 12/2017 |

OTHER PUBLICATIONS

"zBoost TRIO ZB575 User Manual" zBoost Extending Cell Zones, v.314, 22 pp., 2014.

* cited by examiner

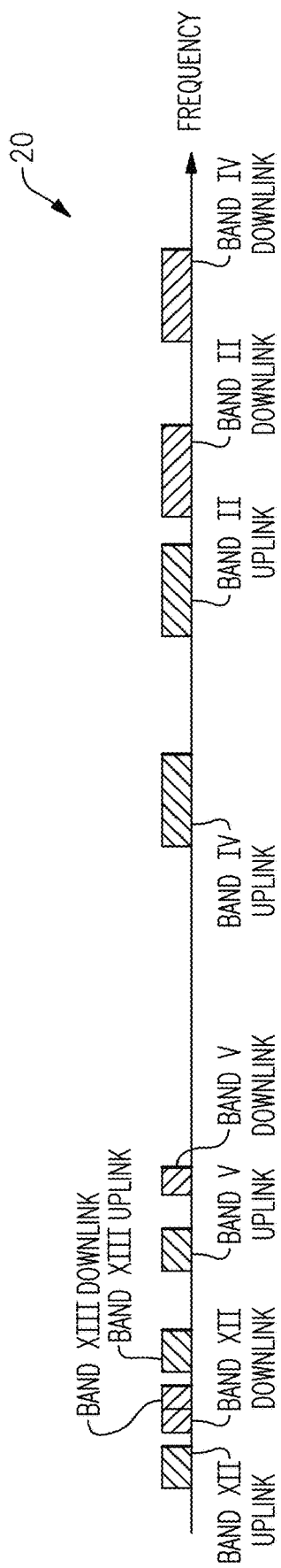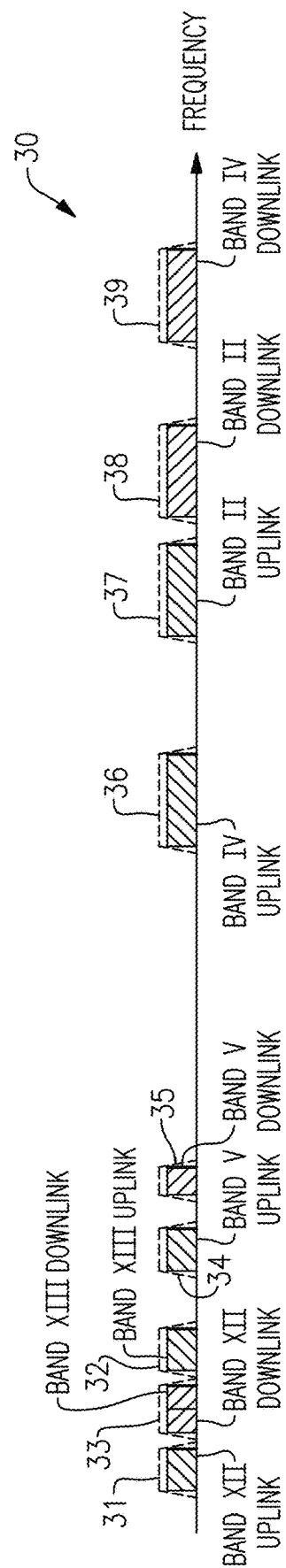

RADIO FREQUENCY SIGNAL BOOSTER

RELATED APPLICATIONS

This application is a continuation of U.S. application Ser. No. 15/691,086, which was filed on Aug. 30, 2017 and is titled "RADIO FREQUENCY SIGNAL BOOSTER," and which claims priority to U.S. Provisional Application No. 62/383,238, which was filed on Sep. 2, 2016 and is titled "RADIO FREQUENCY SIGNAL BOOSTER," U.S. Provisional Application No. 62/425,833, which was filed on Nov. 23, 2016 and is titled "RADIO FREQUENCY SIGNAL BOOSTER," and U.S. Provisional Application No. 62/523,020, which was filed on Jun. 21, 2017 and is titled "RADIO FREQUENCY SIGNAL BOOSTER," the disclosures of which are expressly incorporated by reference herein in their entirety for all purposes. Any and all applications, if any, for which a foreign or domestic priority claim is identified in the Application Data Sheet of the present application are hereby incorporated by reference in their entireties under 37 CFR 1.57.

TECHNICAL FIELD

Embodiments of the present disclosure relate to electronic systems and, in particular, to radio frequency (RF) signal boosters.

BACKGROUND

A cellular network includes base stations for wirelessly communicating with mobile devices located within the network's cells. For example, base stations can transmit signals to mobile devices via a downlink (DL) channel and receive signals from the mobile devices via an uplink (UL) channel. In the case of a cellular network operating using frequency division duplexing (FDD), the downlink and uplink channels are separated in the frequency domain such that the frequency band operates using a pair of frequency channels.

A mobile device may be unable to communicate with any base stations when located in a portion of the cellular network having poor or weak signal strength. For example, the mobile device may be unable to communicate with a particular base station when the mobile device is separated from the base station by a large distance. Additionally, structures such as buildings or mountains can interfere with the transmission and/or reception of signals sent between a mobile device and a base station.

To improve a network's signal strength and/or coverage, a radio frequency (RF) signal booster can be used to amplify signals in the cellular network. For example, the signal booster can be used to amplify or boost signals having frequencies associated with the frequency ranges of the cellular network's uplink and downlink channels.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to an integrated signal booster system for providing cellular and wireless local area network (WLAN) access. The integrated signal booster system may include a housing and at least one antenna integrated with or within the housing. The at least one antenna may be configured to receive a cellular uplink signal from user equipment (UE) of a cellular network and to transmit a boosted cellular downlink signal to the UE. Further, the system may include signal booster circuitry within the housing. This signal booster circuitry may be configured to receive a cellular downlink signal from a cable and send a boosted cellular uplink signal over the cable. Moreover, the signal booster circuitry may be configured to generate the boosted cellular downlink signal based on amplifying the cellular downlink signal and to generate the boosted cellular uplink signal based on amplifying the cellular uplink signal. In addition, the system may include WLAN access point (AP) circuitry within the housing. The WLAN AP circuitry may be configured to control wireless communications with one or more wireless clients of a WLAN network.

In certain embodiments, the system further includes a router within the housing and in communication with the WLAN AP circuitry. In some embodiments, the WLAN AP circuitry comprises a data exchange circuit, a power amplifier, a low noise amplifier, and a switch. Moreover, the signal booster circuitry may comprise a downlink amplification circuit configured to generate the boosted cellular downlink signal based on amplifying one or more downlink channels of the cellular downlink signal and an uplink amplification circuit configured to generate the boosted cellular uplink signal based on amplifying one or more uplink channels of the cellular uplink signal. Further, the WLAN AP circuitry may be configured to control communication of Wi-Fi signals.

In some embodiments, the housing includes an interface configured to connect to an external cellular modem. The WLAN AP circuitry may be operable to receive an Internet connection via the external cellular modem. Further, the system may include an integrated cellular modem within the housing. The WLAN AP circuitry may be operable to receive an Internet connection via the integrated cellular modem. In some cases, the at least one antenna is further configured to transmit a WLAN signal and to receive a WLAN signal. Moreover, the system may further include a combiner within the housing. The combiner may be operable to combine a cellular signal and a WLAN signal. Further, the WLAN AP circuitry may be operable over two or more WLAN frequency bands. The two or more WLAN frequency bands may comprise low band Wi-Fi and high band Wi-Fi.

In some implementations, the at least one antenna comprises at least one cellular antenna and at least one WLAN antenna. The at least one WLAN antenna may be operable to transmit a WLAN transmit signal and to receive a WLAN receive signal. Moreover, the at least one WLAN antenna may comprise two or more WLAN antennas operable to provide multiple-input and multiple-output (MIMO) communications. Further, the system can include a shielding structure positioned between the WLAN AP circuitry and the at least one antenna. The at least one antenna may include at least one cellular antenna within the housing and at least one WLAN antenna within the housing. The at least one cellular antenna may be positioned between the shielding structure and the at least one WLAN antenna. In some cases, the shielding structure is configured to operate as a heat sink.

Certain aspects of the present disclosure relate to a radio frequency signal booster. The radio frequency signal booster may include a housing and a base station antenna port having a first axis along which signals are primarily conducted. The base station antenna port may be configured to be connected to a base station antenna configured to receive wireless communications signals on one or more downlink channels and to transmit wireless communications signals on one or more uplink channels. In addition, the radio frequency signal booster may include a mobile station antenna integrated with or located within the housing. The mobile station antenna may have a second axis in which signals are primarily radiated. This second axis may differ from the first axis. The mobile station antenna may be configured to transmit wireless communication signals on one or more downlink channels. Moreover, the radio frequency signal booster may include an amplifier unit within the housing. The amplifier unit may include a downlink amplifier configured to amplify first signals on downlink channels for transmission through the mobile station antenna. The first signals may be received at the base station antenna port. Further, the amplifier unit may include an uplink amplifier configured to amplify second signals on uplink channels for transmission through the base station antenna port. The second signals may be received at the mobile station antenna.

In certain embodiments, the first axis is at an angle to the second axis that is not a multiple of 90 degrees. Further, the radio frequency signal booster may include a composite cable configured to be connected to the base station antenna port. The composite cable may include a direct current power line and a radio frequency cable. The amplifier unit may be connected to a power adapter via the composite cable. In addition, the amplifier unit may be oriented along a first planar substrate and the second axis may be parallel to the first planar substrate.

In some embodiments, the radio frequency signal booster includes a heat sink configured to at least partially isolate radio signals between the mobile station antenna and the amplifier unit. In some implementations, the mobile station antenna includes an omnidirectional antenna. The omnidirectional antenna may be configured to radiate primarily along a plane parallel to the first planar substrate.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 2A is a schematic diagram of one example of a portion of a frequency spectrum.

FIG. 2B is schematic diagram of the frequency spectrum of FIG. 2A with annotations showing frequency locations of band pass filter pass bands according to certain embodiments.

DETAILED DESCRIPTION OF EMBODIMENTS

Figure 1A:
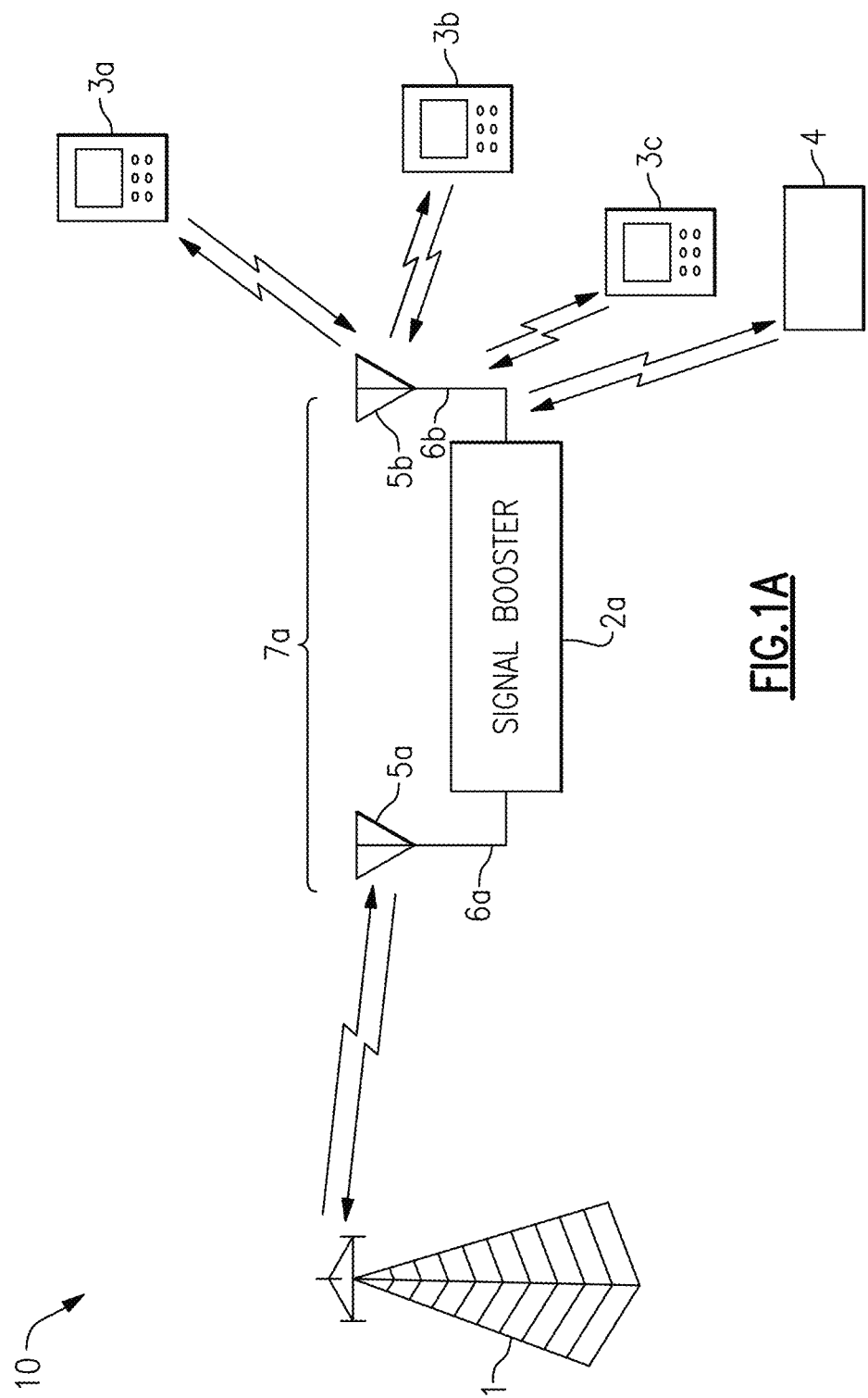
FIG. 1A is a schematic diagram of a mobile network, according to certain embodiments.

Various implementations of systems, methods and devices within the scope of the appended claims each have several aspects, no single one of which is solely responsible for the desirable attributes described herein. Without limiting the scope of the appended claims, some prominent features are described herein.

Various aspects of the novel systems, apparatus, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatus, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a desktop signal booster configured to be placed on a desktop, or other surface. Alternatively, or in addition, the signal booster may be attached to a portion of a building or building structure. For example, the signal booster may be attached to a wall or a ceiling. The booster can include a housing, an amplifier unit, an indoor antenna, and a cable. The amplifier unit and the indoor antenna can be integrated in the housing or can be relatively close together (for example, within a threshold distance of each other, such as within 50 cm, 25 cm, or less than 10 cm of each other). The relative angle of the position of the amplifier unit and the indoor antenna can be non-zero. For example, the relative angles of the amplifier unit and the indoor antenna can be more than a threshold (AO) amount from a multiple of 90 degrees. Thus, the relative angle between the amplifier unit and the indoor antenna can be outside the ranges: $-\Delta\theta$ to $\Delta\theta$, $90°-\Delta\theta$ to $90°+\Delta\theta$, $180°-\Delta\theta$ to $180°+\Delta\theta$, and $270°-\Delta\theta$ to $270°+\Delta\theta$. In some embodiments, the relative angle between the amplifier unit and the indoor antenna can be substantially 45 degrees, such as within $\Delta\theta$ of a multiple of 90 degrees, plus 45 degrees. Thus, the relative angle between the amplifier unit and the indoor antenna can be within the ranges: $45°-\Delta\theta$ to $45°+\Delta\theta$, $135°-\Delta\theta$ to $135°+\Delta\theta$, $225°-\Delta\theta$ to $225°-\Delta\theta$, and $315°-\Delta\theta$ to $315°+\Delta\theta$. In various embodiments, $\Delta\theta$ can include any faction of multiple of a degree. For example, $\Delta\theta$ can be 0.5 degrees, 1 degree, 2 degrees, 5 degrees, 10 degrees, and so on. In some embodiments, the cable connecting the booster with the outdoor antenna can be much longer than the distance between the amplifier unit and the indoor antenna. For example, the cable can be 10×, 20×, or 100× the distance between the amplifier unit and the indoor antenna. In various embodiments, the cable can be over 10 feet long, over 25 feet long, over 50 feet long, over 100 feet long, and so on. The cable can be a composite cable comprising a direct current (DC) line and an RF cable. The amplifier unit can be connected to a power adapter via the composite cable, and connected to an outside antenna receiving signals from the base station via the composite cable. The desktop signal booster can further include a heat sink located between the amplifier unit and the indoor antenna. The heat sink can isolate or attenuate the signal from the indoor antenna to the amplifier unit.

Another aspect of the disclosure provides a signal booster including a separate amplifier unit and an integrated unit, which can be placed on the desktop, or other surface. The desktop integrated unit can include a housing, a Wi-Fi router, an indoor antenna, and a cable. The Wi-Fi router and the indoor antenna can be integrated in the housing or relatively close together. The integrated unit can be connected to the separate amplifier unit via the cable. The cable can be a composite cable comprising a DC line and an RF cable. The Wi-Fi router can be connected to a power adapter via the composite cable. The indoor antenna can include a broadband antenna having a frequency band range including one or more cellular communication frequency bands and Wi-Fi frequency bands. The Wi-Fi router can support 3G data communication, 4G data communication, 5G data communication, or any combination thereof, among other cellular communication technologies. The integrated unit can remotely feed power for the separate amplifier unit via the cable.

Another aspect of the disclosure relates to an integrated signal booster system for providing cellular and wireless local area network (WLAN) access. The integrated signal booster system includes a housing, at least one antenna integrated with or within the housing and configured to receive a cellular uplink signal from user equipment (UE) of a cellular network and to transmit a boosted cellular downlink signal to the UE, signal booster circuitry within the housing and configured to receive a cellular downlink signal from a cable and to send a boosted cellular uplink signal over the cable, and WLAN access point (AP) circuitry within the housing and configured to control wireless communications with one or more wireless clients of a WLAN network. The signal booster circuitry is configured to generate the boosted cellular downlink signal based on amplifying the cellular downlink signal, and to generate the boosted cellular uplink signal based on amplifying the cellular uplink signal.

One type of wireless network is a cellular network, in which base stations wirelessly communicate with user equipment (UE) located within the network's cells. The base stations transmit signals to UE via downlink channels of cellular frequency bands and receive signals from the UE via uplink channels of the cellular frequency bands.

Examples of cellular frequency bands include, but are not limited to, Band II, Band IV, Band V, Band XII, and/or Band XIII For instance, mobile devices in a cellular network can operate using Advanced Wireless Services (AWS) (Band IV), Personal Communication Services (PCS) (Band II), Cellular services (Band V), and/or bands associated with Long Term Evolution (LTE), for instance, Band XII, Band XIII, and various other LTE bands. Furthermore, the teachings herein are also applicable to communications using carrier aggregation, including those associated with 4.5G, 5G technologies, and other emerging mobile communication technologies.

Although specific examples of cellular frequency bands and communication technologies have been described above, the teachings herein are applicable to a wide range of frequency bands and communications standards, including, but not limited to frequency bands associated with 3G (including 3.5G), 4G (including 4.5G), and 5G technologies as specified by the Third Generation Partnership Project (3GPP).

A wide variety of types of UE can connect to a cellular network. For example, UE can include mobile devices, such as mobile phones, tablets, laptops, and/or wearable electronics. UE can also include certain stationary devices, such as customer premises equipment (CPE).

Another type of wireless network is a wireless local area network (WLAN), which allows wireless clients to wirelessly connect to a local area network. WLANs can operate using various wireless communication techniques, such as spread-spectrum or orthogonal frequency-divisional multiplexing (OFDM). Additionally, WLANs can provide a connection through an access point to the wider internet, thereby allowing clients to move within a local coverage area while maintaining an internet connection.

One example of WLANs is Wi-Fi networks as specified by the Institute of Electrical and Electronics Engineers (IEEE) 802.11 wireless communication standards. Examples of Wi-Fi frequency bands include low band Wi-Fi in the 2.4 GHz frequency block and high band Wi-Fi in the 5 GHz frequency block.

A wide variety of types of wireless clients can connect to WLANs. For instance, wireless clients can include certain types of cellular UE that is also WLAN enabled, such as certain mobile phones, tablets, laptops, and/or wearable electronics. Wireless clients can also include other types of WLAN enabled devices, such as desktops, workstations, and/or smart electronics (for instance, consumer electronics, such as televisions).

WLAN networks include access points (APs) that serve to transmit and receive WLAN signals to thereby communicate with wireless clients. For example, an AP of a Wi-Fi network allows Wi-Fi enabled devices to wirelessly connect to a wired network.

An AP connected to a wired network and a set of wireless clients can be referred to as a basic service set (BSS). A BSS has an identifier or BSSID, which can correspond to the media access control (MAC) address of the AP that services the BSS. One type of Wi-Fi BSS is an infrastructure BSS, in which the AP serves as a central hub for communicating with the wireless clients of the BSS. A distribution system (DS) connects two or more APs in an extended service set (ESS). A DS can be wired or wireless and can serve to provide secure roaming for wireless clients.

APs can operate using a variety of encryption or security mechanisms, including, but not limited to, Wired Equivalent Privacy (WEP), Wi-Fi Protected Access (WPA, WPA2), and/or other protocols. Certain APs offer Wi-Fi Protected Setup (WPS) to facilitate adding new wireless clients to an encrypted network.

Certain signal booster systems described herein provide signal boosting for cellular networks, thereby providing extending coverage to UE of the cellular network. Furthermore, various embodiments herein provide not only signal boosting for cellular networks, but also serve as an access point for a WLAN network, such as a Wi-Fi network.

FIG. 1A is a schematic diagram of a mobile network 10, according to one embodiment. The mobile network 10 includes a base station 1, mobile devices 3a-3c, and a signal booster system 7a that includes a base station antenna 5a, a base station antenna cable 6a, a signal booster 2a, a mobile station antenna cable 6b, and a mobile station antenna 5b.

Although the mobile network 10 illustrates an example with three mobile devices and one base station, the mobile network 10 can include base stations and/or mobile devices of other numbers and/or types. For instance, mobile devices can include mobile phones, tablets, laptops, wearable electronics (for instance, smart watches or smart glasses), and/or other types of user equipment (UE) suitable for use in a wireless communication network.

The signal booster 2a can retransmit signals to and receive signals from the base station 1 using the base station antenna 5a, and can retransmit signals to and receive signals from the mobile devices 3a-3c using the mobile station antenna 5b. For example, the signal booster 2a can retransmit signals to the base station 1 over one or more uplink channels, and can receive signals from the base station 1 over one or more downlink channels. Additionally, the signal booster 2a can retransmit signals to the mobiles devices 3a-3c over one or more downlink channels, and can receive signals from the devices over one or more uplink channels.

In the example shown in FIG. 1A, the signal booster 2a is electrically coupled to the base station antenna 5a via the base station antenna cable 6a and to the mobile station antenna 5b via the mobile station antenna cable 6b. Various embodiments include the mobile station antenna 5b and mobile station antenna cable 6b integrated with or within a housing of the signal booster 2b.

In certain implementations, the base station antenna 5a is an outdoor antenna positioned or directed external to a structure, such as a building, and the mobile station antenna 5b is an indoor antenna positioned and configured to communicate with devices within the structure.

Although FIG. 1A illustrates the signal booster 2a as communicating with one base station 1, the signal booster 2a can communicate with multiple base stations. For example, the signal booster 2a can be used to communicate with base stations associated with different cells of a network and/or with base stations associated with different networks, such as networks associated with different wireless carriers and/or frequency bands.

In certain implementations, the mobile devices 3a-3c can communicate at least in part over multiple frequency bands, including one or more cellular bands such as, Band II, Band IV, Band V, Band XII, and/or Band XIII For instance, in one example, the first mobile device 3a can operate using Advanced Wireless Services (AWS) (Band IV), the second mobile device 3b can operate using Personal Communication Services (PCS) (Band II), and the third mobile device 3c can operate using Cellular (for example, 800 MHz in the United States) services (Band V). Furthermore, in certain configurations, all or a subset of the mobile devices 3a-3c can communicate using Long Term Evolution (LTE), and may transmit and receive Band XII signals, Band XIII signals, and/or other signals associated with LTE.

Although specific examples of frequency bands and communication technologies have been described above, the teachings herein are applicable to a wide range of frequency bands and communications standards. For example, signal boosters can be used to boost a wide variety of bands, including, but not limited to, 3G bands, 4G bands, 5G bands, Wi-Fi bands (for example, according to Institute of Electrical and Electronics Engineers 802.11 wireless communication standards), and/or digital television bands (for example, according to Digital Video Broadcasting, Advanced Television System Committee, Integrated Services Digital Broadcasting, Digital Terrestrial Multimedia Broadcasting, and Digital Multimedia Broadcasting standards).

Accordingly, the signal booster 2a can be configured to boost signals associated with multiple frequency bands so as to improve network reception for each of the mobile devices 3a-3c. Configuring the signal booster 2a to service multiple frequency bands can improve network signal strength for multiple devices. For example, the signal booster 2a can improve network signal strength of devices using the same or different frequency bands, the same or different wireless carriers, and/or the same or different wireless technologies. Configuring the signal booster 2a as a multi band booster can avoid the cost of separate signal boosters for each specific frequency band and/or wireless carrier. Additionally, configuring the signal booster 2a as a multi band booster can also ease installation, reduce cabling, and/or issues associated with combining multiple boosters.

The plurality of mobile devices 3a-3c can represent a wide range of mobile or portable communication devices, including, for example, multi band mobile phones. The network device 4 can represent a wide range of other devices configured to communicate over one or more mobile networks, including, for example, computers, televisions, modems, routers, or other electronics. In certain embodiments, the network device 4 is another signal booster. Although FIG. 1A illustrates the signal booster 2a as communicating with three mobile devices 3a-3c and one network device 4, the signal booster 2a can be used to communicate with more or fewer mobile devices and/or more or fewer network devices.

As shown in FIG. 1A, the base station antenna 5a is connected to the signal booster 2a by an RF cable 6a. For example, the base station antenna 5a can be mounted on the roof of a building or another location providing a relatively high signal strength to the base station 1. In some embodiments, the signal booster 2a can be located in an electrical closet inside a building. The signal booster 2a can be connected to the mobile station antenna 5b by an RF cable 6b. The mobile station antenna 5b can be mounted within an occupied space of the building (for example, on an interior wall, table, or ceiling). Accordingly, there are five components to the illustrated booster system 7a: the first or base station antenna 5a, the RF cable 6a, the signal booster 2a, the RF cable 6b, and the second or mobile station antenna 5b. In some embodiments, for example as discussed below with respect to FIG. 1B, the booster system 7a can integrate the base station antenna 5a and the RF cable 6a with or into the signal booster 2a.

Figure 1B:
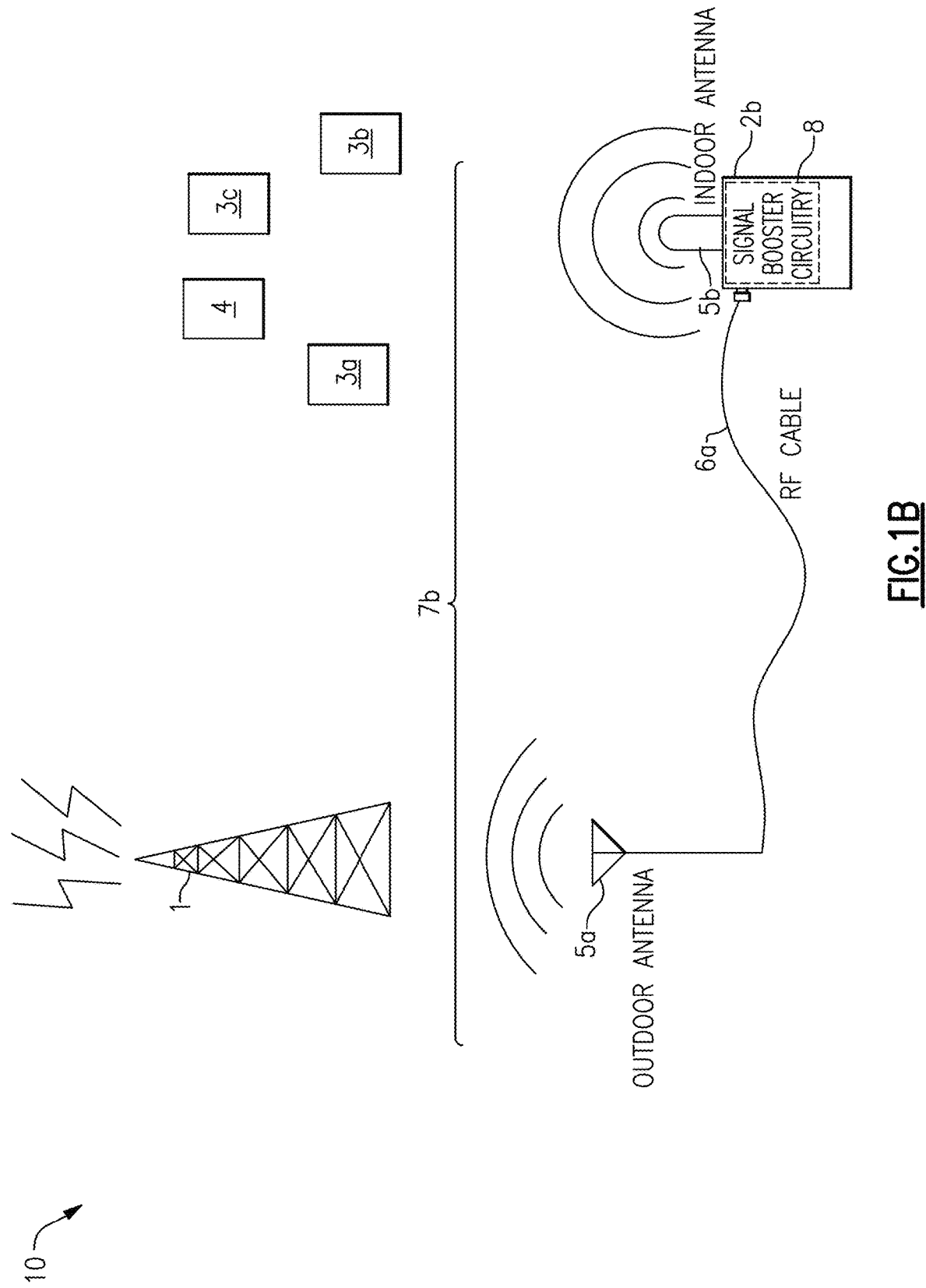
FIG. 1B is a schematic diagram of the mobile network according to certain embodiments.

FIG. 1B is a schematic diagram of the mobile network 10, according to another embodiment. The mobile network 10 includes the base station 1, the mobile devices 3a-3c (three shown), the network device 4, and a signal booster system 7b. The signal booster system 7b includes a base station antenna 5a, an RF cable 6a, and an integrated signal booster 2b.

The integrated signal booster 2b includes a housing with a signal booster circuit or signal booster circuitry 8 therein. The integrated signal booster 2b further includes a mobile station antenna 5b which is integrated with or within the housing.

As shown in FIG. 1B, the integrated signal booster 2b is connected to the base station antenna 4a over the RF cable 6a. The base station antenna 5a can be positioned for advantageous line-of-sight, signal strength, and/or directional gain with respect to one or more base stations 1. In one example, the base station antenna 5a is a directional antenna configured to primarily radiate out a window, or other signal permeable portion, of a building. In another example, the base station antenna 5a is an omnidirectional rooftop antenna. Although two examples of base station antennas have been described, other implementations of base station antennas can be used in accordance with the teachings herein.

The integrated signal booster 2b of FIG. 1B includes the mobile station antenna 5a. In certain implementations, the mobile station antenna 5b is an omnidirectional or directional antenna configured to primarily radiate within a building space. For example, the integrated signal booster 2b can be placed on a desktop or otherwise positioned indoors for communication with UE of a cellular network.

As with the signal booster 2a discussed above with respect to FIG. 1A, the signal booster 2b can retransmit signals to and receive signals from the base station 1 using the base station antenna 5a, and can retransmit signals to and receive signals from the plurality of mobile devices 3a-3c and/or the network device 4 using the mobile station antenna 5b. In particular, the signal booster 2b can be configured to receive downlink signals from one or more base stations, on one or more downlink channels, via the base station antenna 5a. The signal booster 2b can be configured to retransmit the downlink signals to one or more mobile devices, over the one or more downlink channels, via the mobile station antenna 5b. Similarly, the signal booster 2b can be configured to receive signals from the devices, over one or more uplink channels, via the mobile station antenna 5b. The signal booster 2b can be configured to retransmit the uplink signals to one or more base stations, over the one or more uplink channels, via the base station antenna 5a.

Although FIG. 1B illustrates the signal booster 2b communicating with one base station 1, the signal booster 2b can communicate with multiple base stations. For example, the signal booster 2b can be used to communicate with base stations associated with different cells of a network. Furthermore, in certain implementations, the signal booster 2b can communicate with base stations associated with different networks, including, for example, networks associated with different wireless carriers and/or networks associated with different RF frequencies or bands (such as any of the bands discussed above with respect to FIG. 1A).

Figure 1C:
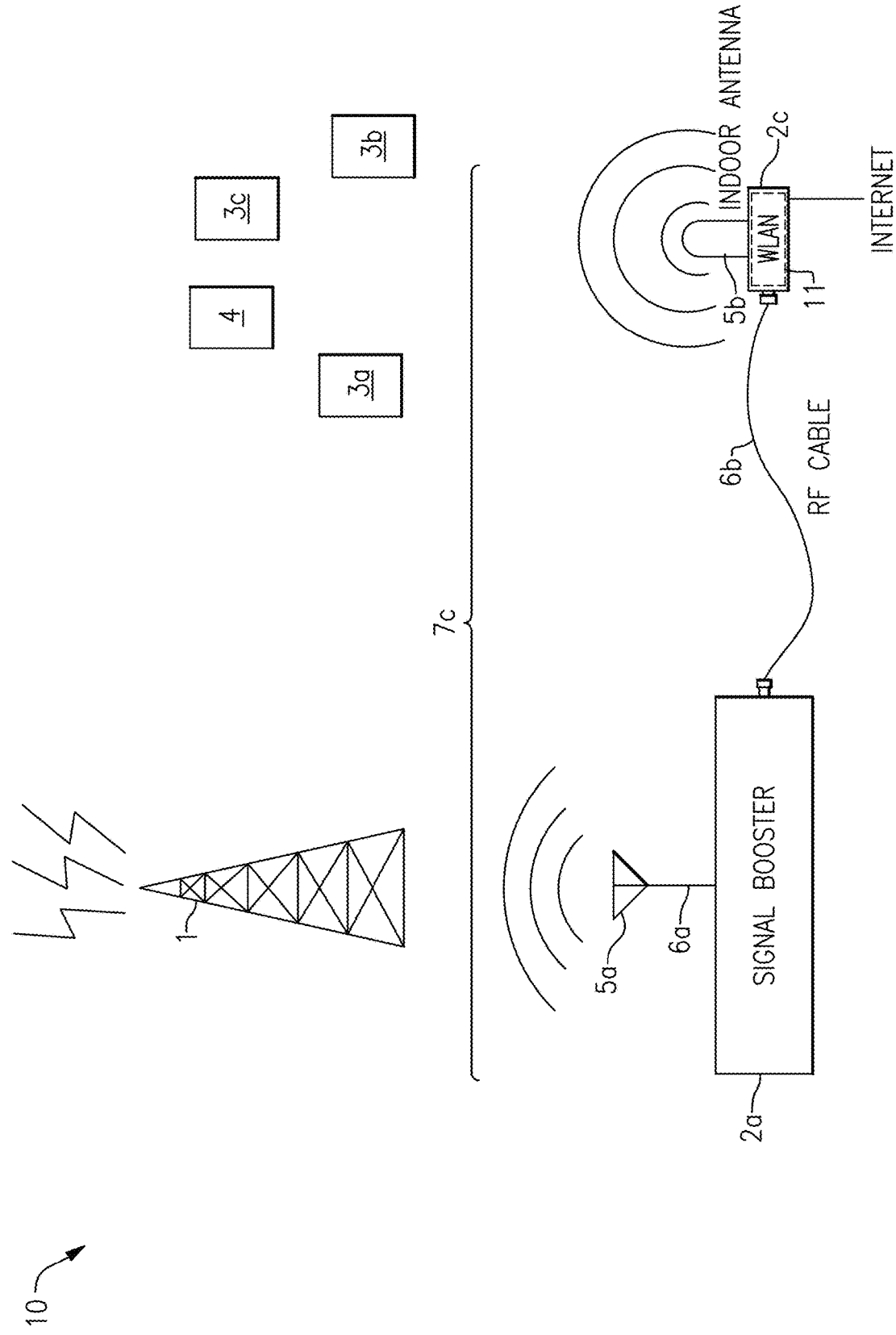
FIG. 1C is a schematic diagram of the mobile network according to certain embodiments.

FIG. 1C is a schematic diagram of the mobile network 10, according to another embodiment. The mobile network 10 includes the base station 1, mobile devices 3a-3c (three shown), the network device 4, and a signal booster system 7c. The signal booster system 7c includes an integrated unit 2c, an RF cable 6b, a signal booster 2a, an RF cable 6a, and a base station antenna 5a.

The integrated unit 2c includes a mobile station antenna 5b integrated with or within the unit's housing. The mobile station antenna 5b serves to transmit boosted cellular downlink signals from the signal booster 2a to UE of a cellular network, and provides the signal booster 2a with cellular uplink signals received from the UE. The integrated unit 2c further includes a WLAN access point 11, which serves to provide wireless clients with access to a WLAN network. For instance, the WLAN access point 11 can include a router that receives an Internet connection, and provides Internet access to the wireless clients. Thus, in various embodiments the WLAN access point 11 can include one or more of a router, cellular data modem, internet port, and so forth.

Accordingly, the illustrated embodiment includes the integrated unit 2c for serving to provide both cellular network access and WLAN access.

Figure 1D:
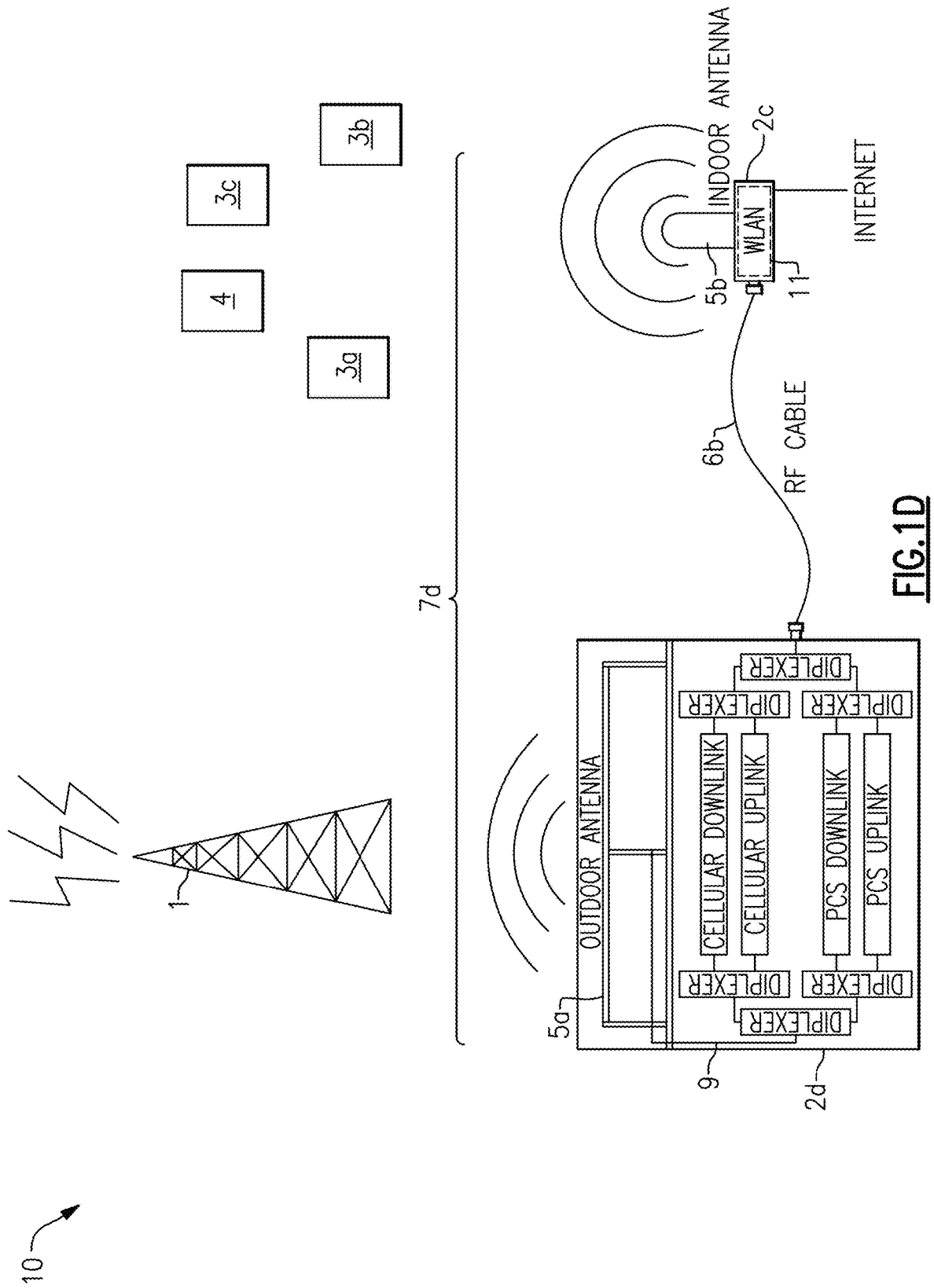
FIG. 1D is a schematic diagram of the mobile network according to certain embodiments.

FIG. 1D is a schematic diagram of the mobile network 10, according to another embodiment. The mobile network 10 includes the base station 1, mobile devices 3a-3c (three shown), the network device 4, and a signal booster system 7d. The signal booster system 7d includes an integrated unit 2c, an RF cable 6b, and a signal booster 2d.

The signal booster system 7d of FIG. 1D is similar to the signal booster system 7c of FIG. 1C, except that the signal booster system 7d illustrates an implementation in which the base station antenna 5b is integrated with or within the signal booster 2d.

Integration of the base station antenna 5a into the signal booster 2d can provide certain advantages, such as reduced signal attenuation over an internal RF cable 9 relative to the external RF cable 6a of FIG. 1C. Furthermore, such integration can eliminate installation cost associated with routing the external RF cable 6a through one or more floors and/or walls of a building to, for instance, reach a roof. On the other hand, integration of the base station antenna 5a into the signal booster 2d can also introduce certain unwanted effects. For example, integration of the base station antenna 5a into the signal booster 2d can increase proximity of the base station antenna 5a to the mobile station antenna 5b (for example, by locating both antennas 5a and 5b in the same room, on the same building floor, etc.), thereby creating unwanted feedback and/or interference effects in some configurations. Furthermore, integration of the base station antenna 5a into the signal booster 2d can result in noise of the signal booster circuitry reaching the base station antenna 5a.

Although FIG. 1D illustrates the signal booster 2d communicating with one base station 1, the signal booster 2d may communicate with multiple base stations. For example, the signal booster 2d can be used to communicate with base stations associated with different cells of a network. Furthermore, in certain implementations, the signal booster 2d can communicate with base stations associated with different networks, including, for example, networks associated with different wireless carriers and/or networks associated with different RF frequencies or bands (such as any of the bands discussed above with respect to FIG. 1A). For example, the illustrated signal booster 2d includes two separate uplink/downlink paths: one for cellular bands and one for using Personal Communication Services (PCS) bands.

Figure 1E:
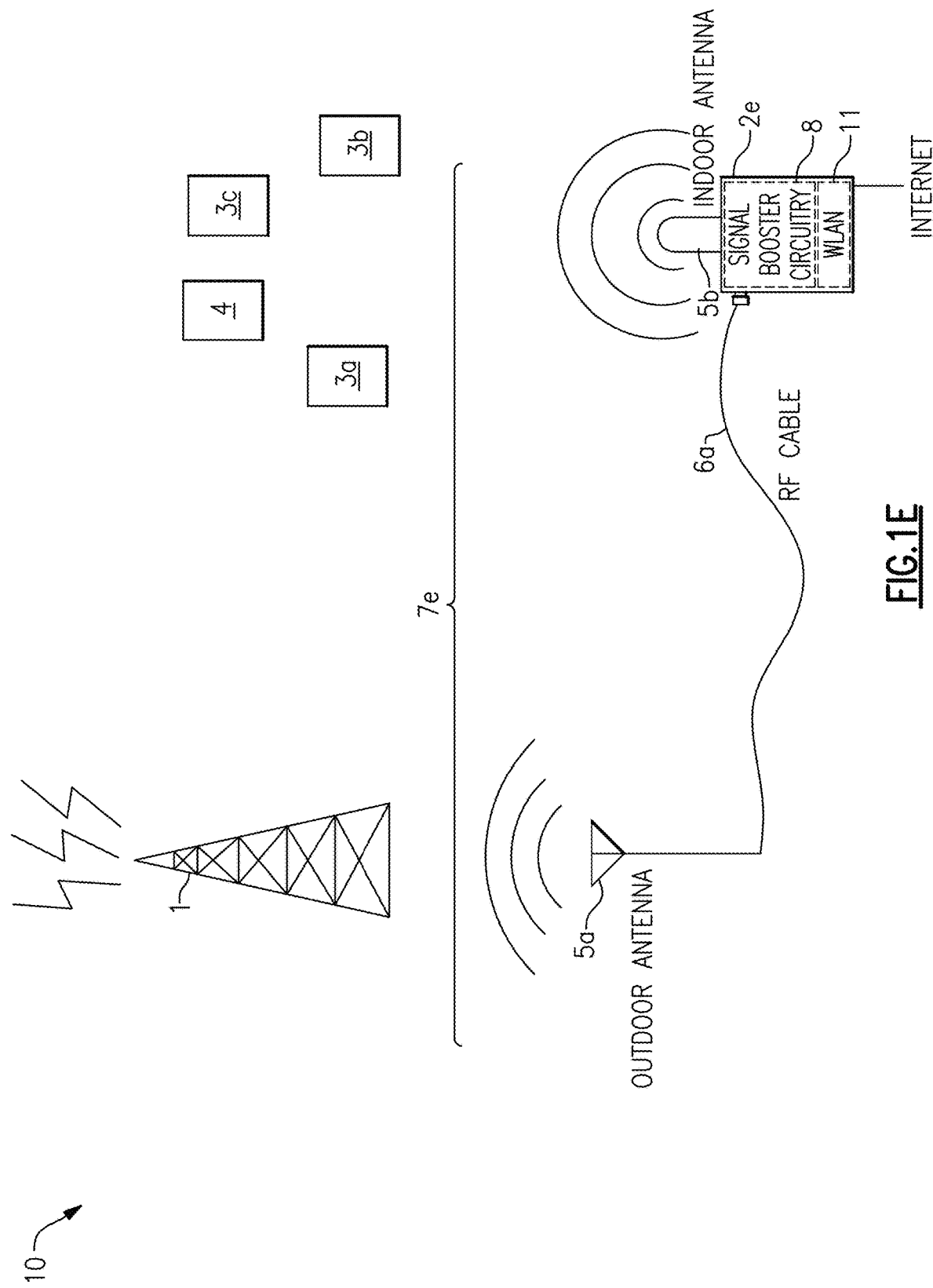
FIG. 1E is a schematic diagram of the mobile network according to certain embodiments.

FIG. 1E is a schematic diagram of the mobile network 10, according to certain embodiments. The mobile network 10 includes the base station 1, mobile devices 3a-3c (three shown), the network device 4, and a signal booster system 7e. The signal booster system 7e includes an integrated signal booster 2e, an RF cable 6a, and a base station antenna 5a.

The signal booster system 7e of FIG. 1E is similar to the signal booster system 7c of FIG. 1C, except that the integrated signal booster 2e of FIG. 1E includes not only a WLAN access point 11 and an integrated base station antenna 5b, but also signal booster circuitry 8 integrated therein. The integrated signal booster 2e serves to provide both cellular network access and WLAN access while providing cellular signal boosting in a common housing. Furthermore, the integrated signal booster 2e is connected to the base station antenna 5a via the RF cable 6a, and thus robust isolation between the base station antenna 5a and the integrated mobile station antenna 5b is maintained.

Figure 1F:
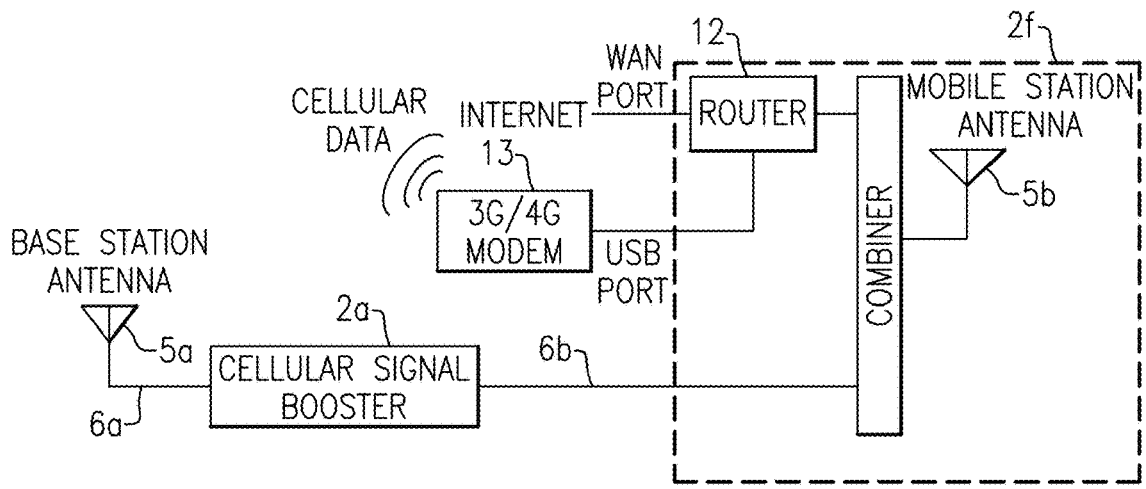
FIG. 1F is a schematic diagram of an integrated signal booster system according to certain embodiments.

FIG. 1F is a schematic diagram of an integrated signal booster system according to another embodiment. The integrated signal booster system includes a base station antenna 5a, a cellular signal booster 2a, an RF cable 6a, an RF cable 6b, and an integrated unit 2f.

In the illustrated embodiment, the integrated unit 2f includes an integrated mobile station antenna 5b. Additionally, the integrated unit 2f includes a router 12, such as a Wi-Fi router. The router 12 can connect to the internet via one or both of a wired connection (for instance, a WAN port) and a wireless connection (for instance, a cellular data modem 13 operating using 3G, 4G (including LTE), and/or 5G). The cellular data modem 13 can include its own antenna for cellular data communication. The router 12 can transmit and receive a Wi-Fi signal or other WLAN signal via a combiner (for instance, a diplexer) in communication with the mobile station antenna 5b. In the illustrated embodiment, the integrated unit 2f is separate from the external cellular signal booster 2a.

The router 12 is physically integrated with the mobile station antenna 5b without a long RF cable. Providing an integrated router can aid in providing wireless clients with a high performance WLAN network, including at high frequencies, for instance, high band Wi-Fi in the 5 GHz block. For example, high frequency WLAN signals, such as high band Wi-Fi signals, can suffer from a relatively large amount of loss when travelling over a long cable.

The cellular data modem 13 provides Internet connectivity to the integrated unit 2f when the wired Internet connection is down or otherwise unavailable. For example, a USB broadband adapter or other cellular data modem 13 can be connected to the integrated unit 2f when desired by a user, for instance, by plugging the cellular data modem 13 into a USB or other port. Although the cellular data modem 13 is illustrated in FIG. 1F as communicating using 3G/4G, a cellular data modem can communicate using any suitable type of cellular communications, including, but not limited to, 3G (including 3.5G), 4G (including 4.5G and LTE), and/or 5G.

In certain implementations, the RF cable 6b is also used to carry a DC supply voltage for powering the cellular signal booster 2a. In one example, a pair of separate cables are physically bundled together to carry RF and DC power. In another example, the RF cable 6b can be implemented as a shared DC power and RF cable, for instance, a coaxial cable or other cable that includes a conductor carrying an RF voltage superimposed on a DC supply voltage. In such implementations, the integrated unit 2f can include circuitry for combining RF and DC while providing isolation and the signal booster can include circuitry for separating DC versus RF while providing isolation. In such implementations, the signal booster's circuitry is powered using the DC supply voltage received from the cable 6b.

Figure 1G:
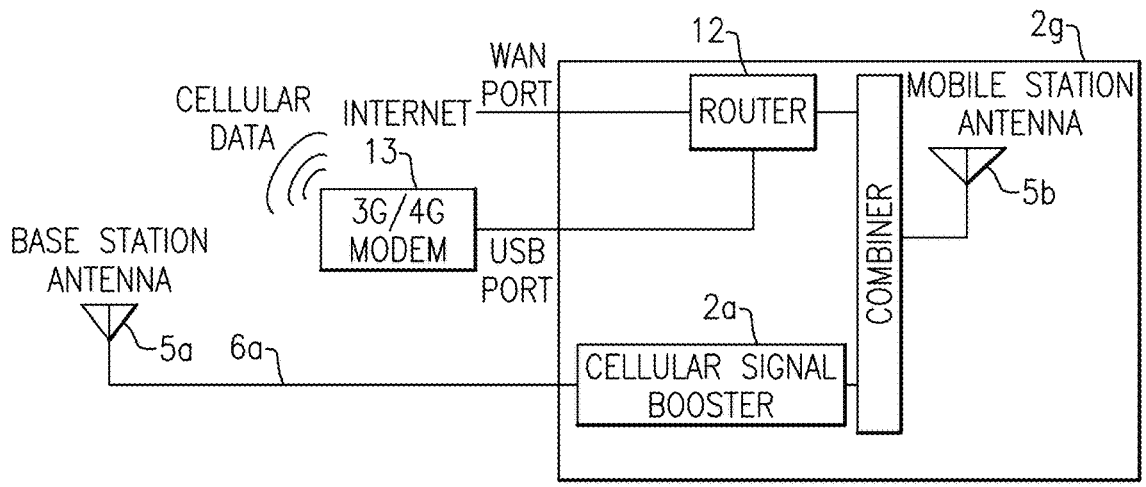
FIG. 1G is a schematic diagram of an integrated signal booster system according to certain embodiments.

FIG. 1G is a schematic diagram of an integrated signal booster system according to another embodiment. The integrated signal booster system of FIG. 1G is similar to the integrated signal booster system of FIG. 1F, except that the integrated signal booster 2g of FIG. 1G includes the cellular signal booster signal 2a integrated therein.

Thus, in the illustrated embodiment, the desktop booster 2g is integrated with the cellular signal booster 2a.

In another implementation, the RF cable 6a is connected to the base station antenna 5a via an external signal booster for further boosting of signals, such that the external signal booster and the signal booster 2a operate in combination to provide a total amount of boosting.

Figure 1H:
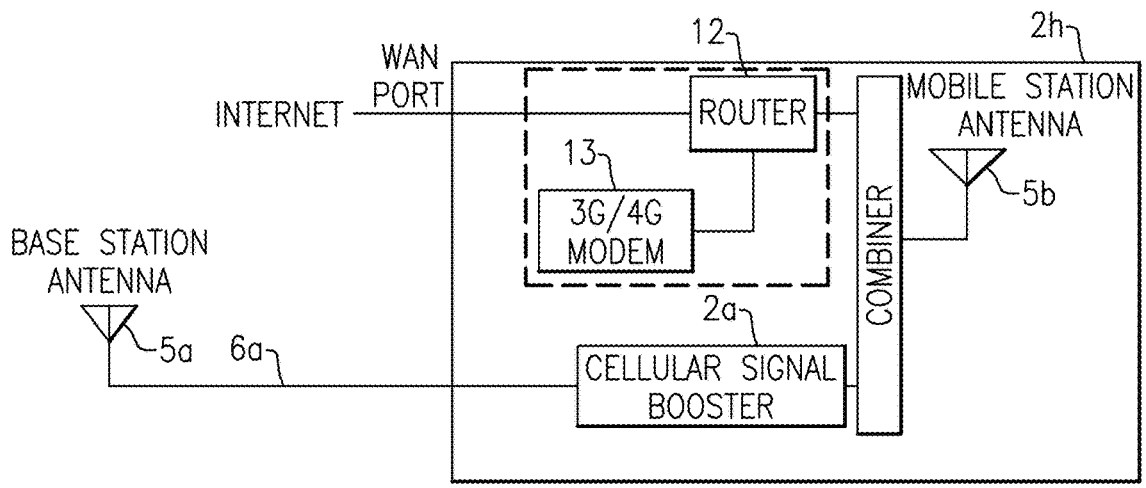
FIG. 1H is a schematic diagram of an integrated signal booster system according to certain embodiments.

FIG. 1H is a schematic diagram of an integrated signal booster system according to another embodiment. The integrated signal booster system of FIG. 1H is similar to the integrated signal booster system of FIG. 1G, except that the integrated signal booster 2h of FIG. 1H includes the cellular data modem 13 integrated therein.

In the illustrated embodiment, the cellular data modem 13 shares an antenna with the cellular signal booster 2a via a combiner (for instance, a diplexer). However, other configurations are possible, such as implementations, with separate cellular and WLAN antennas, and implementations with multiple cellular and/or WLAN antennas.

For example, in certain implementations, an integrated signal booster supports dual band Wi-Fi and/or multiple spatial streams to provide diversity. For example, a first pair of Wi-Fi antennas can operate to transmit and receive low band Wi-Fi data streams to provide low band Wi-Fi MIMO, while a second pair of Wi-Fi antennas can operate to transmit and receive high band Wi-Fi data streams to provide high band Wi-Fi MIMO.

FIG. 2A is a schematic diagram of one example of a portion of a frequency spectrum 20. The frequency spectrum 20 includes a Band XII uplink channel, a Band XII downlink channel, a Band XIII downlink channel, a Band XIII uplink channel, a Band V uplink channel, a Band V downlink channel, a Band IV uplink channel, a Band II uplink channel, a Band II downlink channel, and a Band IV downlink channel. The frequency spectrum 20 of FIG. 2A illustrates one example of the frequency bands that a signal booster described herein can be used for. However, other configurations are possible, such as implementations in which the signal booster amplifies signals of more or fewer frequency bands and/or a different combination of frequency bands.

In certain implementations, the Band XII uplink channel can have a frequency range of about 698 MHz to about 716 MHz, and the Band XII downlink channel can have a frequency range of about 728 MHz to about 746 MHz. Additionally, in certain implementations the Band XIII uplink channel can have a frequency range of about 776 MHz to about 787 MHz, and the Band XIII downlink channel can have a frequency range of about 746 MHz to about 757 MHz. Furthermore, in certain implementations the Band V uplink channel can have a frequency range of about 824 MHz to about 849 MHz, and the Band V downlink channel can have a frequency range of about 869 MHz to about 894 MHz. Additionally, in certain implementations the Band IV uplink channel can have a frequency range of about 1710 MHz to about 1755 MHz, and the Band IV downlink channel can have a frequency range of about 2110 MHz to about 2155 MHz. Furthermore, in certain implementations the Band II uplink channel can have a frequency range of about 1850 MHz to about 1910 MHz, and the Band II downlink channel can have a frequency range of about 1930 MHz to about 1990 MHz.

Although specific frequency ranges have been provided above, persons of ordinary skill in the art will appreciate that the frequencies of the bands can vary by geographical region and/or can change over time based on regulations set by governing agencies such as the Federal Communications Commission (FCC) or the Industry Canada (IC) or Canadian Radio-television and Telecommunications Commission (CRTC).

Additionally, the teachings herein are applicable to configurations in which a signal booster provides amplification to signals of a portion of the sub bands associated with one or more frequency bands. For example, certain frequency bands, including, for example, the PCS band, can be associated with a plurality of sub bands, and the teachings herein are applicable to configurations in which the signal booster operates to provide boosting for signals of only some of the sub bands.

Certain signal boosters can use a separate amplification path for each channel of each frequency band that the signal booster is used for. For example, each amplification path of the signal booster can include a band-pass filter having a passband for passing a particular uplink or downlink channel signal while attenuating or blocking signals of other frequencies. Configuring the signal booster in this manner can aid in maintaining the booster's compliance with communication standards and/or regulator rules, such as those limiting spurious and/or out-of-band emissions.

The radio frequency spectrum has become increasingly crowded with signals as mobile technologies have advanced and the demand for high speed wireless communication has expanded. For example, there has been an increase in a number and proximity of frequency bands that are being utilized by mobile devices and networks.

The increased crowding of the radio frequency spectrum has constrained the design and development of signal boosters, particular multi-band signal boosters that provide boosting across multiple frequency bands, including, for example, adjacent frequency bands. For example, a band-pass filter used to select a particular uplink or downlink channel for boosting can have a non-ideal passband associated with roll-off near the passband's edges. The filter's roll-off can lead to an increase in undesired spurious and/or out of band emissions associated with amplification of signals outside of the particular channel's frequency band. Although a particular uplink or downlink channel may be selected by using a relatively sharp filter such as a cavity filter, such filters can be prohibitive in cost and/or size.

Provided herein are apparatus and methods for RF signal boosters. In certain implementations, a multi-band signal booster is provided for boosting the signals of the uplink and downlink channels of at least a first frequency band and a second frequency band. The first and second frequency bands can be closely positioned in frequency, and the uplink channel of the first frequency band and the uplink channel of the second frequency band can be adjacent. Or, alternatively, the downlink channel of the first frequency band and the downlink channel of the second frequency band can be adjacent. For example, the duplex of the first and second frequency bands can be reversed such that the order in frequency of the first frequency band's uplink and downlink channels is flipped or reversed relative to the second frequency band's uplink and downlink channels.

In certain configurations, the downlink channels of the first and second channels are adjacent, and the signal booster includes a first amplification path for boosting the uplink channel signals of the first frequency band, a second amplification path for boosting the uplink channel signals of the second frequency band, and a third amplification path for boosting the downlink channel signals of the first and second frequency bands. For example, the first amplification path can include a first band-pass filter for passing the first frequency band's uplink channel signals and for attenuating signals of other frequencies such as the first frequency band's downlink channel signals, and the second amplification path can include a second band-pass filter for passing the second frequency band's uplink channel signals and for attenuating signals of other frequencies such as the second frequency band's downlink channel signals. Additionally, the third amplification path can include a third band-pass filter for passing the downlink channel signals of the first and second frequency bands and for attenuating signals of other frequencies such as the uplink channel signals of the first and second frequency bands. Thus, the signal booster can include a shared amplification path that operates to boost the signals on the downlink channels of adjacent frequency bands.

However, in other configurations, the uplink channels of the first and second channels are adjacent, and the signal booster includes a first amplification path for boosting the signals on the downlink channel of the first frequency band, a second amplification path for boosting the signals on the downlink channel of the second frequency band, and a third amplification path for boosting the signals on the uplink channels of the first and second frequency bands. In other arrangements, two amplification paths can be employed for boosting the signals on both uplink channels and both downlink channels of the first and second frequency bands.

The signal boosters described herein can be used to boost signals of multiple frequency bands, thereby improving signal strength for devices using different communications technologies and/or wireless carriers. Configuring the signal booster in this manner can avoid the cost of multiple signal boosters, such as having a specific signal booster for each frequency band. Additionally, the signal boosters can have reduced component count and/or size, since band pass filters, amplifiers, attenuators and/or other circuitry can be shared for at least two channels. Furthermore, the signal boosters herein can be implemented without the cost of filters with relatively sharp passbands, such as cavity filters, which can have a high cost and/or occupy a large area. Thus, the signal boosters herein can be implemented using filters having a relatively low cost and/or a relatively small size, such as surface acoustic wave (SAW) filters and/or ceramic filters.

FIG. 2B is schematic diagram of the frequency spectrum of FIG. 2A with annotations, represented by dashed lines, showing frequency locations of band pass filter passbands according to one embodiment.

In the illustrated configuration, a first band-pass filter passband 31 has been implemented to pass or select signals of a Band XII uplink channel, and a second band pass filter passband 32 has been implemented to pass signals of a Band XIII uplink channel. Furthermore, a third band-pass filter passband 33 has been implemented to pass signals of both a Band XII downlink channel and a Band XIII downlink channel. Additionally, a fourth band-pass filter passband 34 has been implemented to pass signals of a Band V uplink channel, and a fifth band-pass filter passband 35 has been implemented to pass signals of a Band V downlink channel. Furthermore, a sixth band pass filter passband 36 has been implemented to pass signals of a Band IV uplink channel, and a seventh band-pass filter passband 37 has been implemented to pass signals of a Band II uplink channel. Additionally, an eighth band pass filter passband 38 has been implemented to pass signals of a Band II downlink channel, and a ninth band pass filter passband 39 has been implemented to pass signals of a Band IV downlink channel. Although FIG. 2B illustrates a single passband for each frequency channel, a signal booster can include a plurality of band pass filters that are cascaded, with or without intervening circuitry, to achieve an overall channel filtering.

As used herein, a band-pass filter can "pass" a particular frequency channel signal when the frequency channel is substantially within the band-pass filter's passband, even when the filter provides gain or loss in the passband. Accordingly, the teachings herein are not limited to bandpass filters having unity-gain passbands. Furthermore, in certain implementations, a band pass filter herein can be implemented by cascading a low pass filter and a high pass filter. For example, cascading a high-pass filter having a cutoff frequency of f1 and a low pass filter having a cutoff frequency of f2, where f2 is greater than f1, can operate to provide a band pass filter having a passband between about f1 and about f2.

As shown in FIG. 2B, the third band-pass filter passband 33 advantageously passes the downlink channel signals of both Band XII and Band XIII, which are adjacent frequency bands. The illustrated configuration takes advantage of the reverse duplex of the Band XIII frequency band relative to that of the Band XII frequency band. For example, a typical frequency band, such as Band XIII, Band II, Band IV, and Band V, uses an uplink channel that is at a lower frequency than a corresponding downlink channel of the same band. However, Band XIII uses a reverse configuration in which the downlink channel is at a lower frequency relative to the uplink channel. Configuring a signal booster to have a band-pass filter that passes both the Band XII and Band XIII downlink signals can avoid a need for sharp band pass filters for separately filtering the signals of the downlink bands, which can be difficult using relative small and/or low cost filters such as SAW filters and/or ceramic filters, which can have a non-ideal passband and can provide insufficient channel filtering or selectivity.

Figure 3:
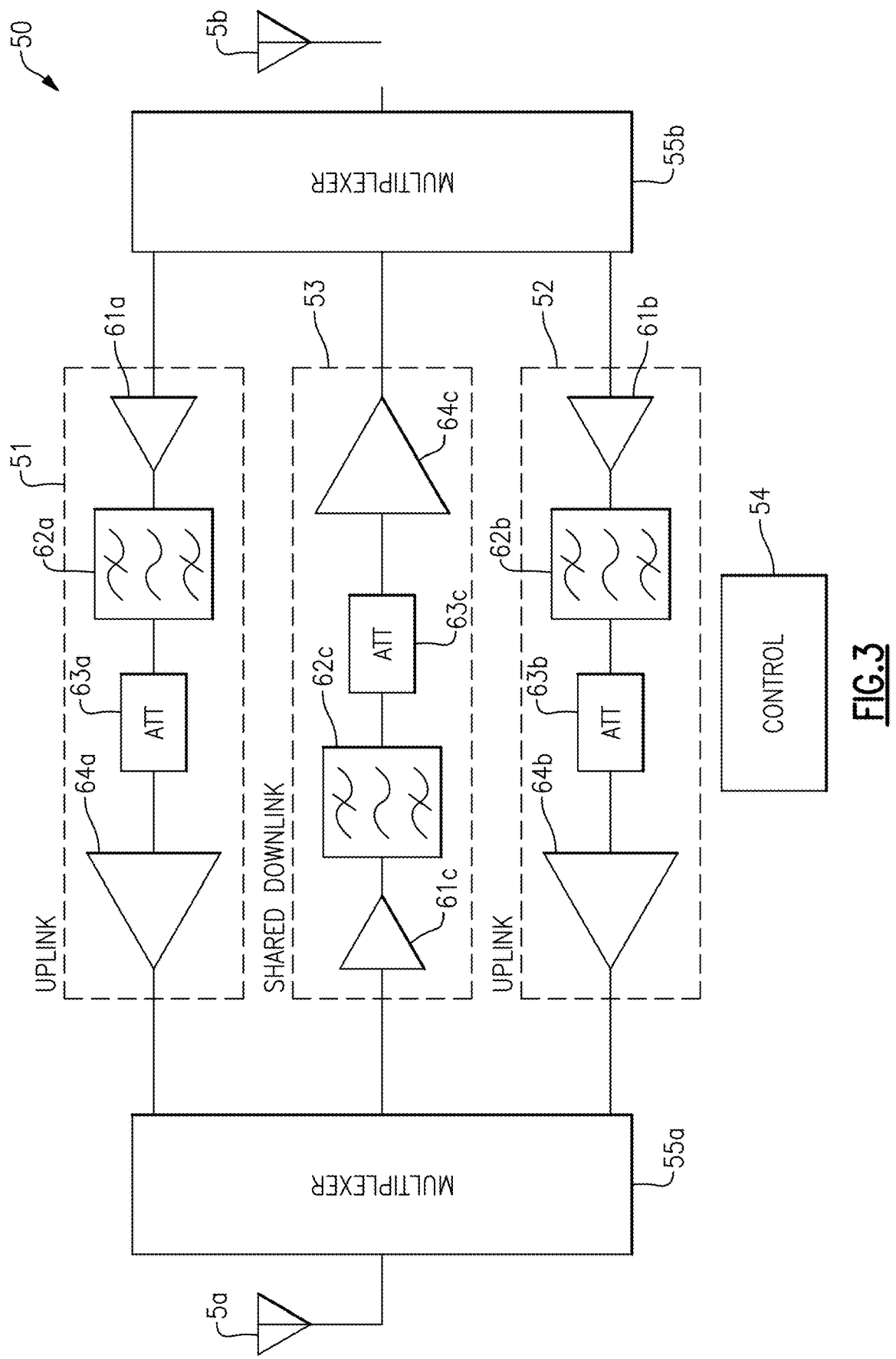
FIG. 3 is a schematic diagram of a signal booster for uplink and downlink channels for two bands according to certain embodiments.

FIG. 3 is a schematic diagram of a signal booster 50 for uplink and downlink channels for two bands according to one embodiment. The signal booster 50 includes first and second multiplexers 55a, 55b, first to third amplification paths or circuits 51-53, and a control circuit 54. In the illustrated configuration, the signal booster 50 is electrically coupled to the base station and mobile station antennas, such as by cables. However, other configurations are possible, including, for example, configurations in which one or both of the mobile station and base station antennas are integrated with a signal booster, particularly in view of the signal isolation between antennas as described herein.

The first multiplexer 55a includes a first terminal electrically connected to an output of the first amplification path 51, a second terminal electrically connected to an output of the second amplification path 52, a third terminal electrically connected to an input of the third amplification path 53, and an antenna terminal electrically connected to the base station antenna 5a. The second multiplexer 55b includes a first terminal electrically connected to an input of the first amplification path 51, a second terminal electrically connected to an input of the second amplification path 52, a third terminal electrically connected to an output of the third amplification path 53, and an antenna terminal electrically connected to the mobile station antenna 5b.

The first amplification path 51 includes a first low noise amplifier (LNA) 61a, a first band pass filter 62a, a first attenuator 63a, and a first power amplifier (PA) 64a. The first LNA 61a, the first band pass filter 62a, the first attenuator 63a, and the first PA 64a are cascaded with an input of the first LNA 61a operating as the first amplification path's input and with an output of the first PA 64a operating as the first amplification path's output. The second amplification path 52 includes a second LNA 61b, a second band pass filter 62b, a second attenuator 63b, and a second PA 64b. The second LNA 61b, the second band-pass filter 62b, the second attenuator 63b, and the second PA 64b are cascaded with an input of the second LNA 61b operating as the second amplification path's input and with an output of the second PA 64b operating as the second amplification path's output. The third amplification path 53 includes a third LNA 61c, a third band pass filter 62c, a third attenuator 63c, and a third PA 64c. The third LNA 61c, the third band-pass filter 62c, the third attenuator 63c, and the third PA 64c are cascaded with an input of the third LNA 61c operating as the third amplification path's input and with an output of the third PA 64c operating as the third amplification path's output.

In certain embodiments, the gain of each of the first to third amplification paths 51-53 is selected to be in the range of about 10 dB to about 90 dB. In other embodiments, the gain can be less than 10 dB or more than 90 dB. In certain configurations, the gain of one or more of the first to third amplification paths 51-53 can be externally controlled, such as by using one or more switches and/or by using digital configuration. Although one example of gain values has been provided, other configurations are possible.

The first to third LNAs 61*a*-61*c* can provide low noise amplification for the first to third amplification paths 51-53, respectively. In certain implementations, the first to third LNAs 61*a*-61*c* can be used to amplify signals having a relatively small amplitude while adding or introducing a relatively small amount of noise. For example, in certain embodiments, each of the LNAs 61*a*-61*c* has a noise figure of 1 dB or less. However, other configurations are possible.

The first to third band pass filters 62*a*-62*c* include inputs electrically coupled to outputs of the first to third LNAs 61*a*-61*c*, respectively. The first to third band pass filters 62*a*-62*c* can filter the frequency content of the amplified signals generated by the first to third LNAs 61*a*-61*c*, respectively. In certain embodiments, the first to third band pass filters 62*a*-62*c* can be analog filters with fixed filtering characteristics and/or low costs, such as ceramic or SAW filters. However, other configurations are possible. Additional details of the first to third band pass filters 62*a*-62*c* will be described further below.

The first to third attenuators 63*a*-63*c* can be used to attenuate the signals filtered by the first to third band pass filters 62*a*-62*c*, respectively. The first to third attenuators 63*a*-63*c* can be used to limit a gain of the first to third amplification paths 51-53, respectively. For example, it can be desirable to provide attenuation in one or more of the first to third amplification paths 51-53, such as in configurations in which one or more of the input signals to the amplification paths have a relatively large amplitude, which can occur when the signal booster 50 is positioned relatively close to a base station. In certain embodiments, the attenuation of the first to third attenuators 63*a*-63*c* can be controlled using one or more processing or control units. For example, one or more embedded CPUs can be used to provide gain control, such as programmable gain control. In certain implementations, the first to third attenuators 63*a*-63*c* can be implemented using analog attenuation components. However, other configurations are possible, such as implementations using digital attenuators, such as digital step attenuators.

The first to third PAs 64*a*-64*c* can be used to amplify the signals attenuated by the first to third attenuators 63*a*-63*c*, respectively. The first to third PAs 64*a*-64*c* can be used to provide amplified RF output signals that have a magnitude suitable for transmission via an antenna. The first to third PAs 64*a*-64*c* can be implemented using single or multi-stage configurations. For example, multi-stage configurations can be implemented with automatic gain control (AGC).

The control circuit 54 can be used to control the operation of the circuitry of the signal booster 50. For example, in certain implementations, the control circuit 54 can be used to control the level of attenuation of the first to third attenuators 63*a*-63*c*, an amount of gain of the first to third PAs 64*a*-64*c* and/or the first to third LNAs 61*a*-61*c*, and/or to provide other control operations in signal booster 50. For clarity of the figures, connections and control signals generated by the control circuit 54 have been omitted. Additionally, although not illustrated in FIG. 3, the signal booster 50 can include additional circuitry such as directional couplers, which can aid the control circuit 54 in controlling output power levels of the first to third amplification paths 51-53. Accordingly, in certain implementations the control circuit 54 can operate to provide automatic gain control (AGC). The control circuit 54 can also operate to provide other functionalities, including, for example, automatic oscillation detection and/or automatic shutdown to prevent interference with base stations.

The first and second multiplexers 55*a*, 55*b* can be used to provide multiplexing between the first to third amplification paths 51-53 and the base station and mobile station antennas, respectively. For example, the first multiplexer 55*a* can be used to combine the amplified output signals from the first and second amplification paths 51, 52 for transmission via the base station antenna 5*a*, and to filter a receive signal received on the base station antenna 5*a* to provide an input signal to the third amplification path 53. Additionally, the second multiplexer 55*b* can be used to provide the amplified output signal from the third amplification path 53 to the mobile station antenna 5*b*, and to filter a receive signal received on the mobile station antenna 5*b* to provide appropriate input signals to the first and second amplification paths 51, 52.

In certain implementations, the first multiplexer 55*a* can include a band pass filter associated with one of the multiplexer's first to third terminals. Additionally, the second multiplexer 55*b* can include a band pass filter associated with one of the multiplexer's first to third terminals. The band-pass filter associated with a particular terminal can be configured to pass frequencies corresponding to those of an associated amplification path that is connected to the terminal. For example, in certain configurations, the band-pass filters of the multiplexers 55*a*, 55*b* have a passband similar to that of a corresponding one of the band-pass filters 62*a*-62*c* of the amplification paths 51-53. Furthermore, in certain implementations, one or both of the first and second multiplexers 55*a*, 55*b* can be omitted. For example, in certain embodiments, the signal booster 50 omits the first and second multiplexers 55*a*, 55*b* in favor of using a separate antenna at the input and output of each of the amplification paths 51-53.

The signal booster 50 can be used to boost the signals on the uplink and downlink channels of first and second frequency bands that are adjacent or closely positioned in frequency, such as when adjacent frequency bands have a duplex that is reversed. For example, in certain embodiments, the signal booster 50 is used to boost the signals of Band XII and Band XIII, which are adjacent in frequency and have uplink and downlink channels that are flipped or reversed in frequency such that the Band XII downlink channel and the Band XIII downlink channel are positioned between the Band XII uplink channel and the Band XIII uplink channel. For example, the Band XII downlink channel can have a greater frequency than the Band XII uplink channel, and the Band XIII uplink channel can have a greater frequency than the Band XIII downlink channel.

Additionally, the signal booster 50 includes the first and second amplification paths 51, 52, which can be used to amplify the signals on the uplink channels of the first and second bands. Furthermore, the signal booster 50 includes the third amplification path 53, which operates as a shared amplification path that boosts the signals on both the downlink channel of the first frequency band and the downlink channel of the second frequency band. Thus, in contrast to a conventional signal booster that includes a separate amplification path for each frequency channel on which the signals are boosted, the illustrated configuration includes a shared amplification path for amplifying the signals on adjacent downlink channels, such as close or abutting downlink channels. In other embodiments, the third amplification path 53 can be split into two separate amplification paths: one for the downlink channel of the first frequency band and another for the downlink channel of the second frequency band. In still other embodiments, two shared amplification paths can be employed for boosting signals on both uplink channels and both downlink channels of the first and second frequency bands.

To provide suitable channel filtering, the first band-pass filter 62a can pass the first frequency band's uplink channel signals and attenuate the first frequency band's downlink channel signals. Additionally, second band-pass filter 62b can pass the second frequency band's uplink channel and attenuate the second frequency band's downlink channel. Furthermore, the third band-pass filter 62c can pass the downlink channels of both the first and second frequency bands and attenuate the uplink channels of both the first and second frequency bands. Thus, the third amplification path 53 is shared between the downlink channels of the first and second frequency bands and operates to simultaneously boost or repeat the signals on the downlink channels. Since the third amplification path 53 boosts the signals on the downlink channels of both the first and second frequency bands, relatively sharp filters need not be used to separately filter these channels. Thus, the first to third band pass filters 62a 62c can be implemented using filters having a relatively low cost and/or a relatively small size, such as surface acoustic wave (SAW) and/or ceramic filters.

Although the signal booster 50 has been described in the context of a single amplification path boosting multiple downlink channels, the teachings herein are applicable to configurations in which a single amplification path is used to boost the signals on multiple uplink channels. For example, the teachings herein are applicable to configurations in which a shared amplification path is used to boost the signals on the uplink channels of two frequency bands that are adjacent, such as when the duplex of the first and second frequency bands is reversed such that the bands' uplink channels are positioned between the bands' downlink channels.

In certain embodiments, the adjacent uplink channels or the adjacent downlink channels of the first and second frequency bands are separated in frequency by less than about 10 MHz. Furthermore, in certain implementations, the adjacent uplink channels or the adjacent downlink channels of the first and second frequency bands are abutting, such that there is substantially no separation or gap (e.g., about 0 MHz) between the channel frequencies.

Although one implementation of a signal booster is illustrated in FIG. 3, other configurations are possible. For example, the signal booster can include more or fewer amplifications paths. Additionally, one or more of the amplification paths can be modified to include more or fewer components and/or a different arrangement of components. For example, in certain implementations, the order of a band-pass filter and an attenuator can be reversed in a cascade, the band pass filters can be positioned before the LNAs in one or more of the cascades, and/or additional components can be inserted in the cascade.

Figure 4:
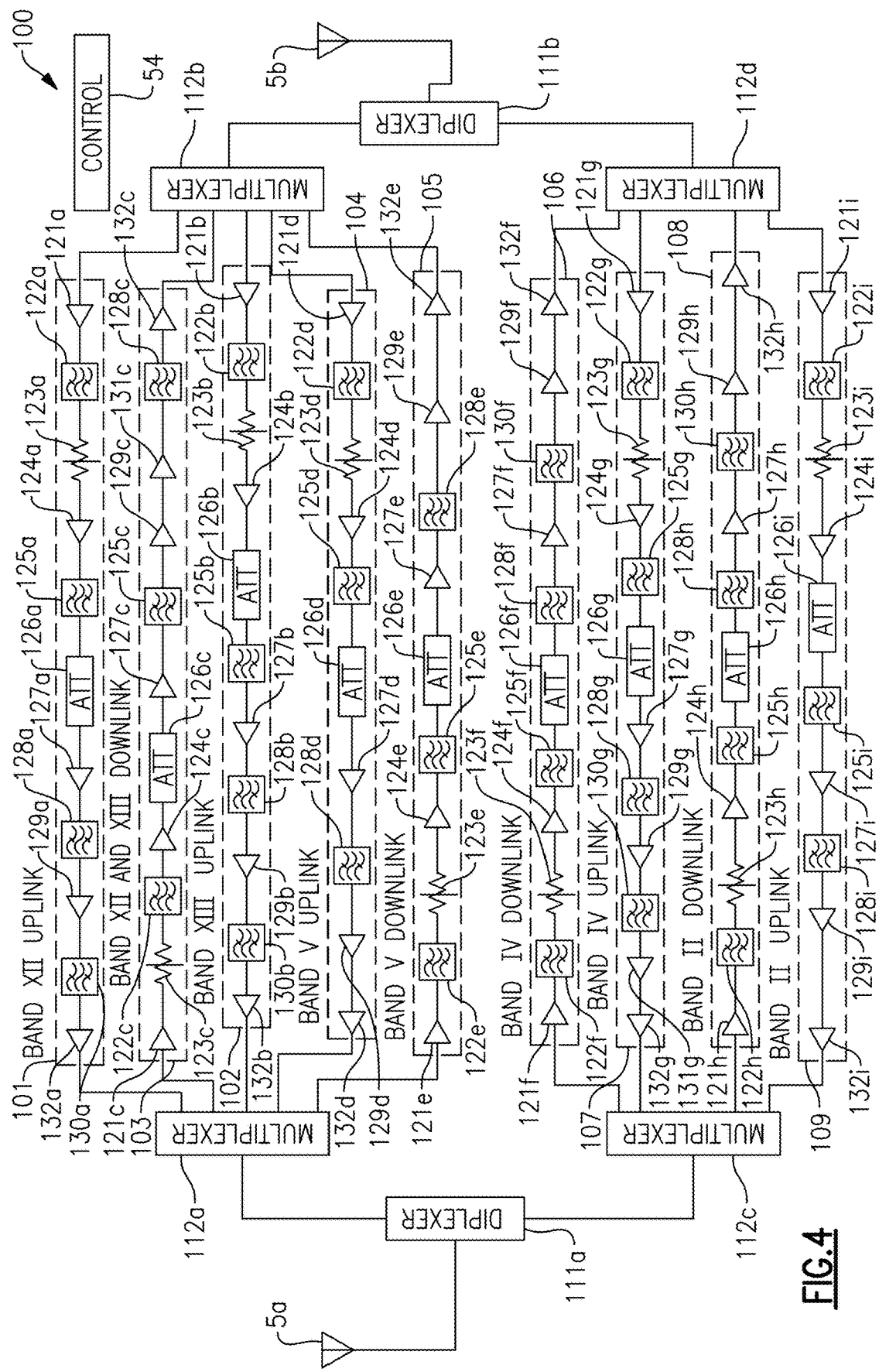
FIG. 4 is a schematic diagram of a signal booster for uplink and downlink channels for five bands according to certain embodiments.

FIG. 4 is a schematic diagram of a signal booster 100 for uplink and downlink channels for five bands according to certain embodiments. The signal booster 100 includes the control circuit 54, first to fourth multiplexers 112a-112d, first and second diplexers 111a, 111b, and first to ninth amplification paths or circuits 101-109. The signal booster 100 is electrically coupled to the base station antenna 5a and to the mobile station antenna 5b.

The first diplexer 111a includes an antenna terminal electrically connected to the base station antenna 5a, a first terminal electrically connected to an antenna terminal of the first multiplexer 112a, and a second terminal electrically connected to an antenna terminal of the third multiplexer 112c. The second diplexer 111b includes an antenna terminal electrically connected to the mobile station antenna 5b, a first terminal electrically connected to an antenna terminal of the second multiplexer 112b, and a second terminal electrically connected to an antenna terminal of the fourth multiplexer 112d.

The first multiplexer 112a further includes a first terminal electrically connected to an output of the first amplification path 101, a second terminal electrically connected to an output of the second amplification path 102, a third terminal electrically connected to an input of the third amplification path 103, a fourth terminal electrically connected to an output of the fourth amplification path 104, and a fifth terminal electrically connected to an input of the fifth amplification path 105. The second multiplexer 112b further includes a first terminal electrically connected to an input of the first amplification path 101, a second terminal electrically connected to an input of the second amplification path 102, a third terminal electrically connected to an output of the third amplification path 103, a fourth terminal electrically connected to an input of the fourth amplification path 104, and a fifth terminal electrically connected to an output of the fifth amplification path 105.

The third multiplexer 112c includes a first terminal electrically connected to an input of the sixth amplification path 106, a second terminal electrically connected to an output of the seventh amplification path 107, a third terminal electrically connected to an input of the eighth amplification path 108, and a fourth terminal electrically connected to an output of the ninth amplification path 109. The fourth multiplexer 112d includes a first terminal electrically connected to an output of the sixth amplification path 106, a second terminal electrically connected to an input of the seventh amplification path 107, a third terminal electrically connected to an output of the eighth amplification path 108, and a fourth terminal electrically connected to an input of the ninth amplification path 109.

In the illustrated configuration, the first amplification path 101 can provide amplification gain to a Band XII uplink channel, and the second amplification path 102 can provide amplification gain to a Band XIII uplink channel. Furthermore, the third amplification path 103 can provide amplification gain to both the Band XII and Band XIII downlink channels. Additionally, the fourth amplification path 104 can provide amplification gain to the Band V uplink channel, and the fifth amplification path 105 can provide amplification gain to the Band V downlink channel. Furthermore, the sixth amplification path 106 can provide amplification gain to the Band IV downlink channel, and the seventh amplification path 107 can provide amplification gain to the Band IV uplink channel. Additionally, the eighth amplification path 108 can provide amplification gain to the Band II downlink channel, and the ninth amplification path 109 can provide amplification gain to the Band II uplink channel.

The first and second multiplexers 112a, 112b can provide multiplexing operations for the first to fifth amplification paths 101-105. The first and second multiplexers 112a, 112b can include a band pass filter for each of the multiplexers' first to fifth terminals. The band pass filters can have passbands positioned at frequencies corresponding to the uplink or downlink channels of an associated amplification path. Additionally, the third and fourth multiplexers 112c, 112d can provide multiplexing operations for the sixth to ninth amplification paths 106-109. The third and fourth multiplexers 112c, 112d can include a band pass filter for each of the multiplexers' first to fourth terminals. The band pass filters can have passbands positioned at frequencies corresponding to the uplink or downlink channels of an associated amplification path.

The first diplexer 111a can be used to combine/split signals from/to the antenna terminals of the first and third multiplexers 112a, 112c, and can be used to combine/split signals to/from the base station antenna 5a. Additionally, the second diplexer 111b can be used to combine/split signals from/to the antenna terminals of the second and fourth multiplexers 112b, 112d, and can be used to combine/split signals to/from the mobile station antenna 5b. Including the first and second diplexers 111a, 111b in the signal booster 100 can aid the signal booster 100 in operating over disjoint frequency bands by combining signals separated by a relatively large frequency difference. For example, in the illustrated configuration, the first diplexer 111a, in combination with the multiplexer 112a, may combine the Band XII uplink, Band XIII uplink, and Band V uplink signals. As another example, the second diplexer 111b, in combination with the multiplexer 112b, may combine the Band XII and XIII downlink signal with the Band V downlink signal.

Each of the first to ninth amplification paths 101-109 can include different combinations of components, such as amplifiers, attenuators, and band pass filters, selected to achieve an overall amplification characteristic desirable for a particular band.

In the illustrated configuration, the first amplification path 101 includes a cascade of an LNA 121a, a first band pass filter 122a, a power level control circuit 123a, a first intermediate amplifier or gain circuit 124a, a second band pass filter 125a, an attenuator 126a, a second gain circuit 127a, a third band pass filter 128a, a third gain circuit 129a, a fourth band pass filter 130a, and a power amplifier 132a. Additionally, the second amplification path 102 includes a cascade of an LNA 121b, a first band pass filter 122b, a power level control circuit 123b, a first gain circuit 124b, an attenuator 126b, a second band pass filter 125b, a second gain circuit 127b, a third band pass filter 128b, a third gain circuit 129b, a fourth band pass filter 130b, and a power amplifier 132b. Furthermore, the third amplification path 103 includes a cascade of an LNA 121c, a power level control circuit 123c, a first band pass filter 122c, a first gain circuit 124c, an attenuator 126c, a second gain circuit 127c, a second band pass filter 125c, a third gain circuit 129c, a fourth gain circuit 131c, a third band pass filter 128c, and a power amplifier 132c. Additionally, the fourth amplification path 104 includes a cascade of an LNA 121d, a first band pass filter 122d, a power level control circuit 123d, a first gain circuit 124d, a second band pass filter 125d, an attenuator 126d, a second gain circuit 127d, a third band pass filter 128d, a third gain circuit 129d, and a power amplifier 132d. Furthermore, the fifth amplification path 105 includes a cascade of an LNA 121e, a first band pass filter 122e, a power level control circuit 123e, a first gain circuit 124e, a second band pass filter 125e, an attenuator 126e, a second gain circuit 127e, a third band pass filter 128e, a third gain circuit 129e, and a power amplifier 132e.

Additionally, in the illustrated configuration, the sixth amplification path 106 includes a cascade of an LNA 121f, a first band pass filter 122f, a power level control circuit 123f, a first gain circuit 124f, a second band pass filter 125f, an attenuator 126f, a third band pass filter 128f, a second gain circuit 127f, a fourth band pass filter 130f, a third gain circuit 129f, and a power amplifier 132f. Furthermore, the seventh amplification path 107 includes a cascade of an LNA 121g, a first band pass filter 122g, a power level control circuit 123g, a first gain circuit 124g, a second band pass filter 125g, an attenuator 126g, a second gain circuit 127g, a third band pass filter 128g, a third gain circuit 129g, a fourth band pass filter 130g, a fourth gain circuit 131g, and a power amplifier 132g. Additionally, the eighth amplification path 108 includes a cascade of an LNA 121h, a first band pass filter 122h, a power level control circuit 123h, a first gain circuit 124h, a second band pass filter 125h, an attenuator 126h, a third band pass filter 128h, a second gain circuit 127h, a fourth band pass filter 130h, a third gain circuit 129h, and a power amplifier 132h. Furthermore, the ninth amplification path 109 includes a cascade of an LNA 121i, a first band pass filter 122i, a power level control circuit 123i, a first gain circuit 124i, an attenuator 126i, a second band pass filter 125i, a second gain circuit 127i, a third band pass filter 128i, a third gain circuit 129i, and a power amplifier 132i.

The signal booster 100 of FIG. 4 is similar to the signal booster 50 of FIG. 3, except that the signal booster 100 of FIG. 4 has been expanded to boost signals of five frequency bands and has been adapted to include additional filters, amplifiers and other circuitry, such as additional components in cascades associated with the amplification paths. In the illustrated configuration, each of the amplification paths 101-109 includes an LNA, a power amplifier, an attenuator, and at least one band pass filter. Additionally, as shown in FIG. 4, the connection between the amplifications paths 101-109 and the antennas 5a, 5b through the multiplexers 112a-112d and the diplexers 111a, 111b can be symmetric. For example, in the illustrated configuration, each of the amplification paths 101-109 is coupled to the antennas 5a, 5b through one multiplexer and one diplexer. Although configuring the signal booster 100 to be symmetric can reduce noise, other implementations are possible, including, for example, asymmetric configurations.

As shown in FIG. 4, a type, number, and/or order of the components in an amplification path can be selected to provide a desired amplification characteristic for a particular frequency channel. For example, a number of gain circuits can be selected to achieve a desired amplification characteristic for the channel(s), while a number of pass band filters can be selected to achieve a desired filtering characteristic for the channel(s).

In certain configurations, the power level control circuits 123a-123i are included to adjust the gain of the first to ninth amplification paths 101-109, respectively. For example, in certain implementations, the power level control circuits 123a-123i can be used to adjust or limit the gain when the power level of an associated amplification path exceeds a maximum power threshold level. However, in other configurations, one or more of the power level control circuits 123a-123i can be omitted.

In the illustrated configuration, the signal booster 100 includes the third amplification path 103, which has been configured to boost signals on both a Band XII downlink channel and a Band XIII downlink channel. The third amplification path 103 includes first to third band pass filters 122c, 125c, 128c, each of which can have a passband configured to pass signals on both the Band XII and Band XIII downlink channels while attenuating other frequency signals. Thus, in contrast to the signal booster 50 of FIG. 3 which includes one band bass filter 62b in the third amplification path 53, the signal booster 100 illustrates a configuration using three band pass filters 122c, 125c, 128c in the third amplification path 103. Using a plurality of band pass filters in an amplification path can increase a strength or degree of filtering. For example, cascading multiple band pass filters can be useful in high gain configurations, in which an amplification path has a relatively large amount of gain.

Although FIG. 4 illustrates one example of a signal booster in accordance with the teachings herein, other configurations are possible. For example, the teachings herein are applicable to configurations in which the signal booster 100 boosts signals of more or fewer bands, or a different combination of bands.

FIGS. 5A-7B illustrate various views of a signal booster according to certain embodiments. The signal booster 200 illustrates one embodiment of a signal booster including an integrated mobile station antenna and signal booster circuitry.

Figure 5A:
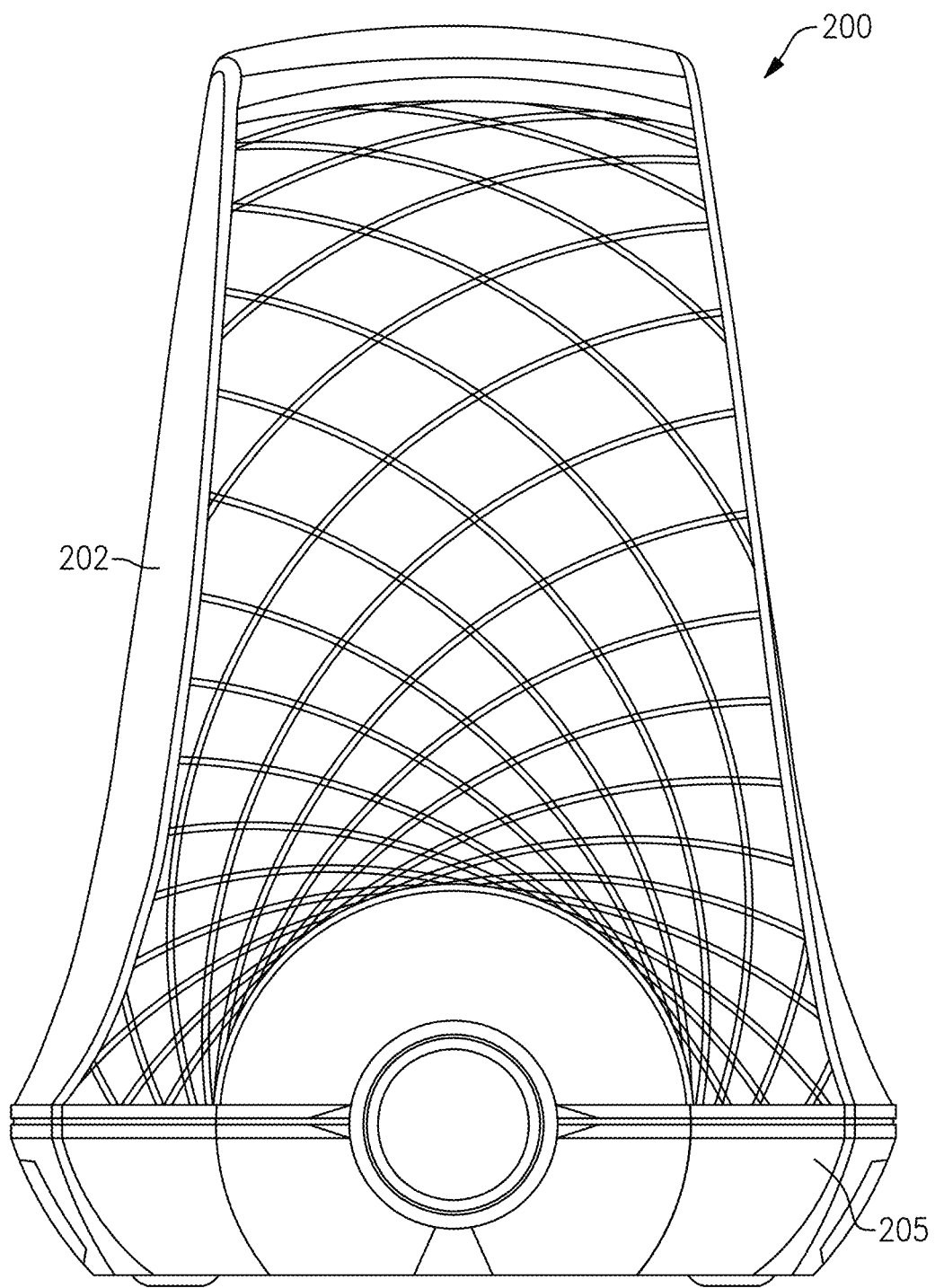
FIG. 5A is a front view of a desktop signal booster according to certain embodiments.
Figure 5B:
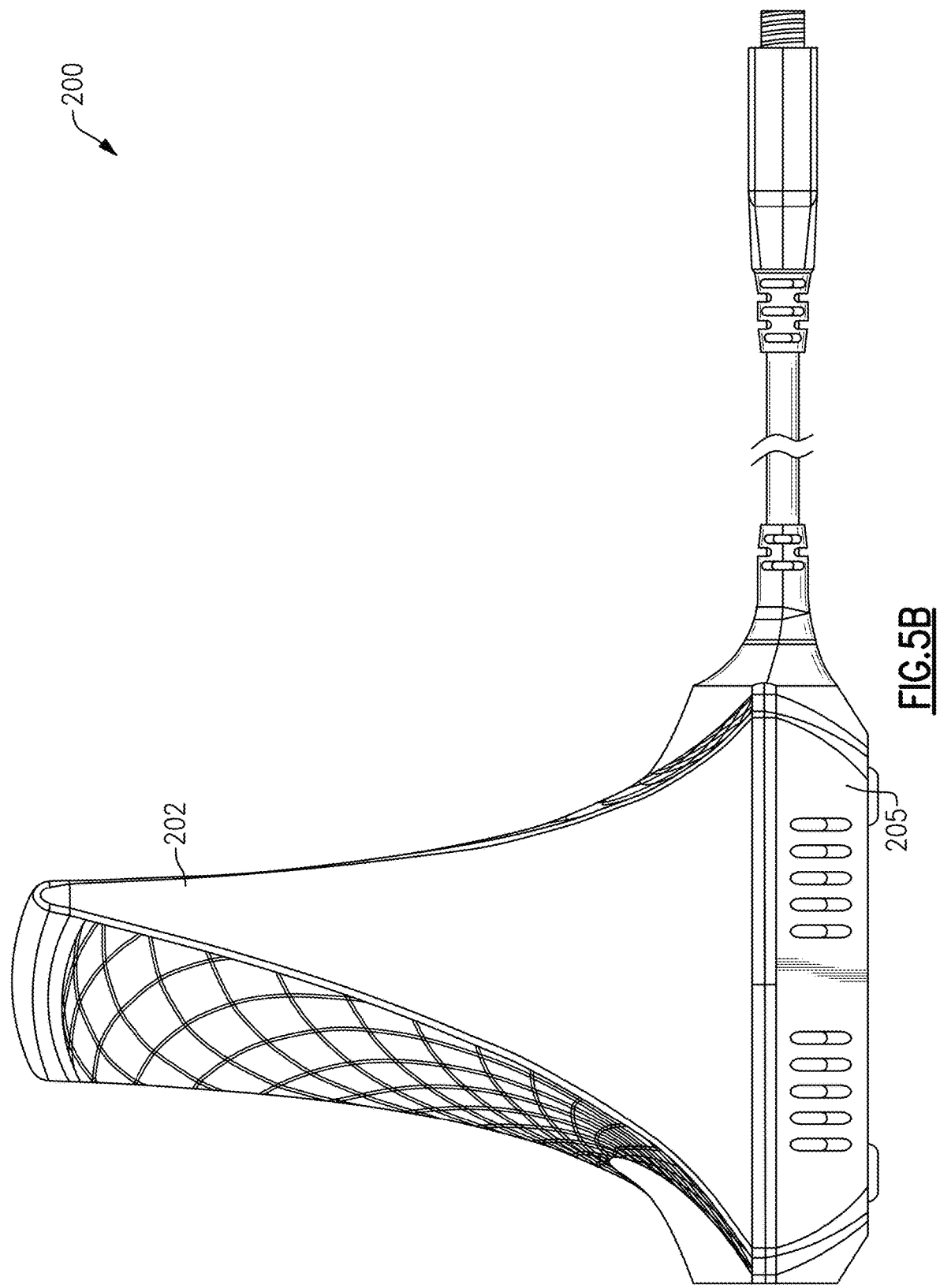
FIG. 5B is a right-side view of the desktop signal booster of FIG. 5A.
Figure 5C:
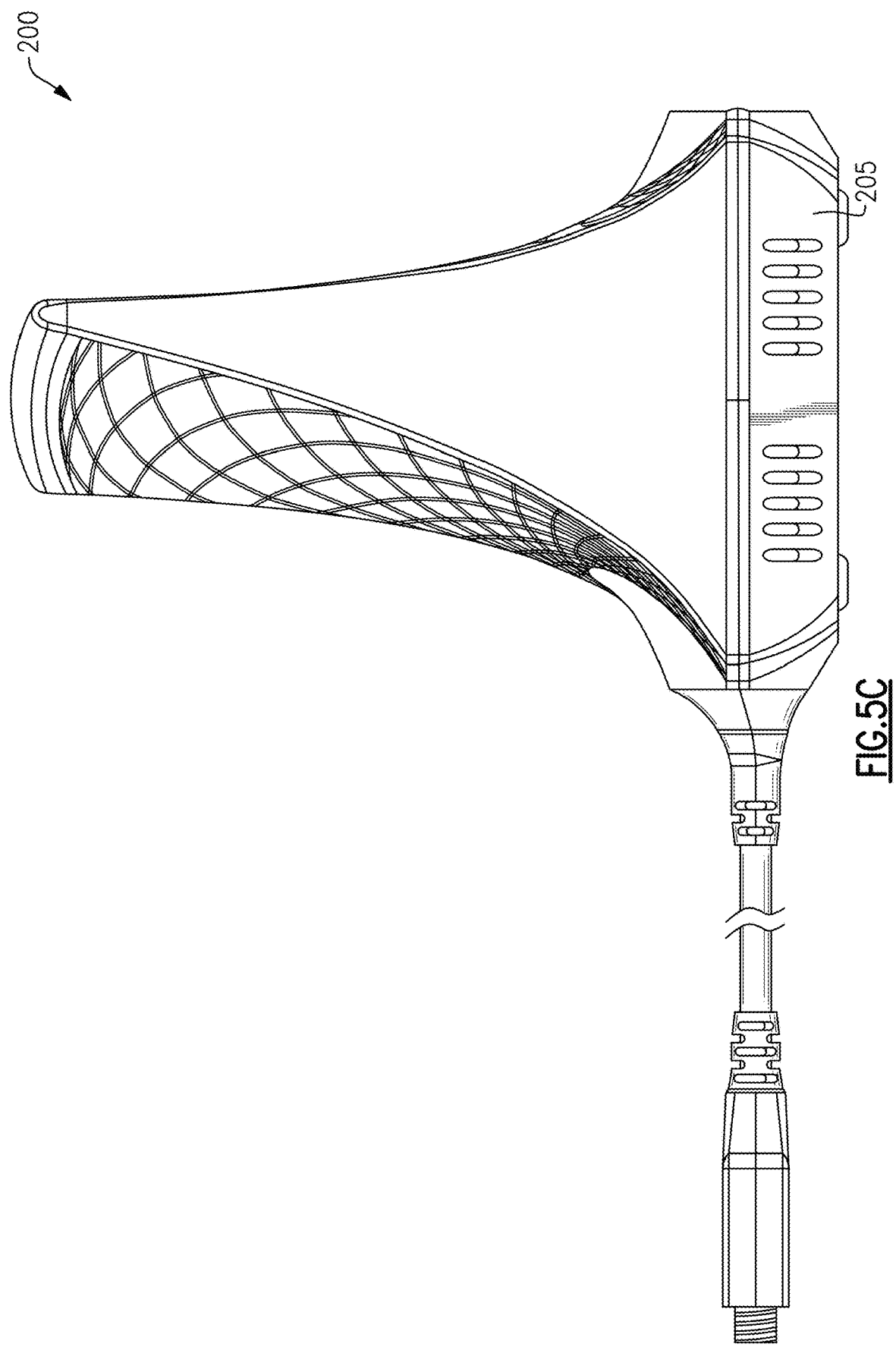
FIG. 5C is a left-side view of the desktop signal booster of FIG. 5A.
Figure 5D:
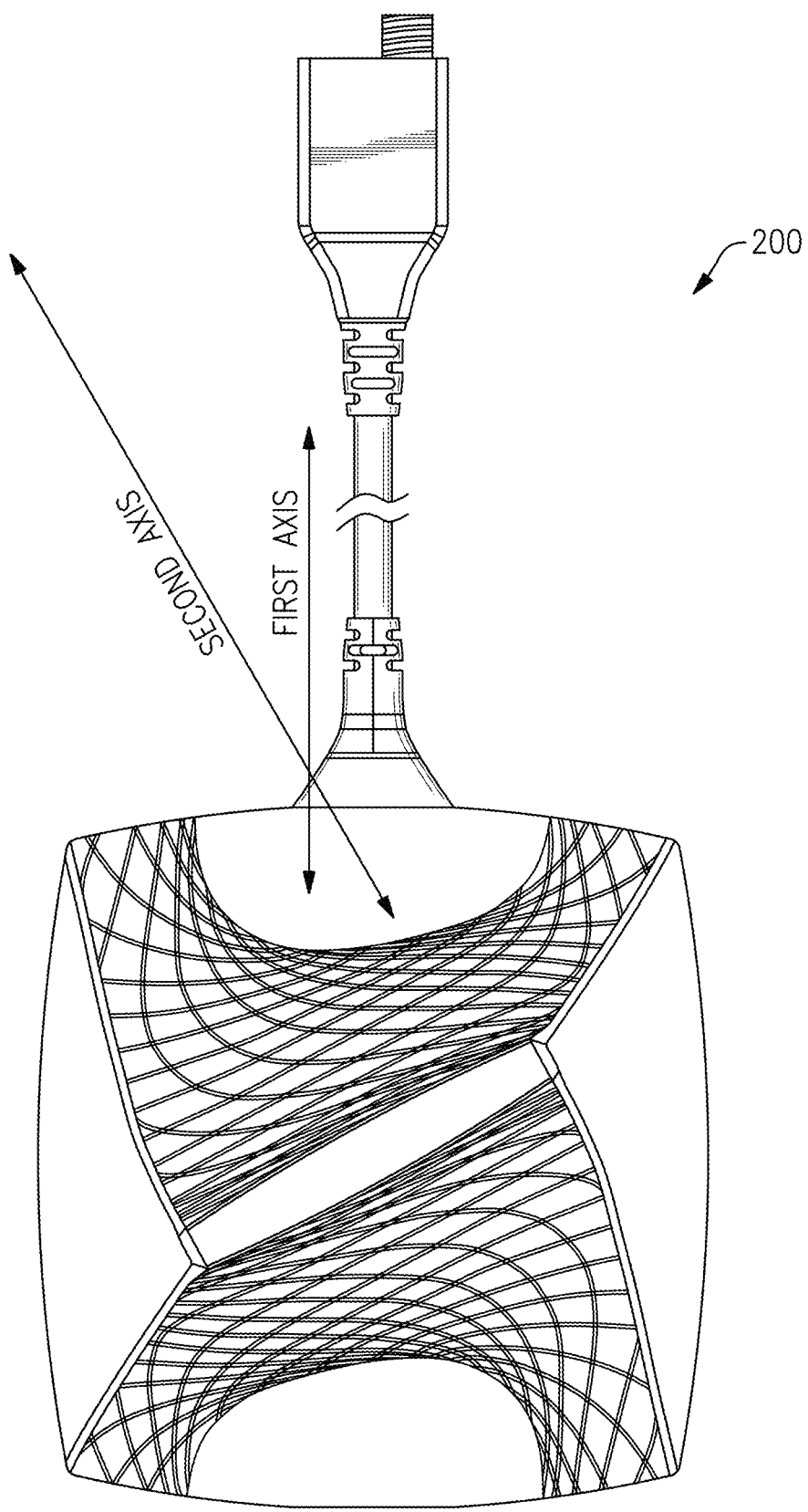
FIG. 5D is a top view of the desktop signal booster of FIG. 5A.
Figure 5E:
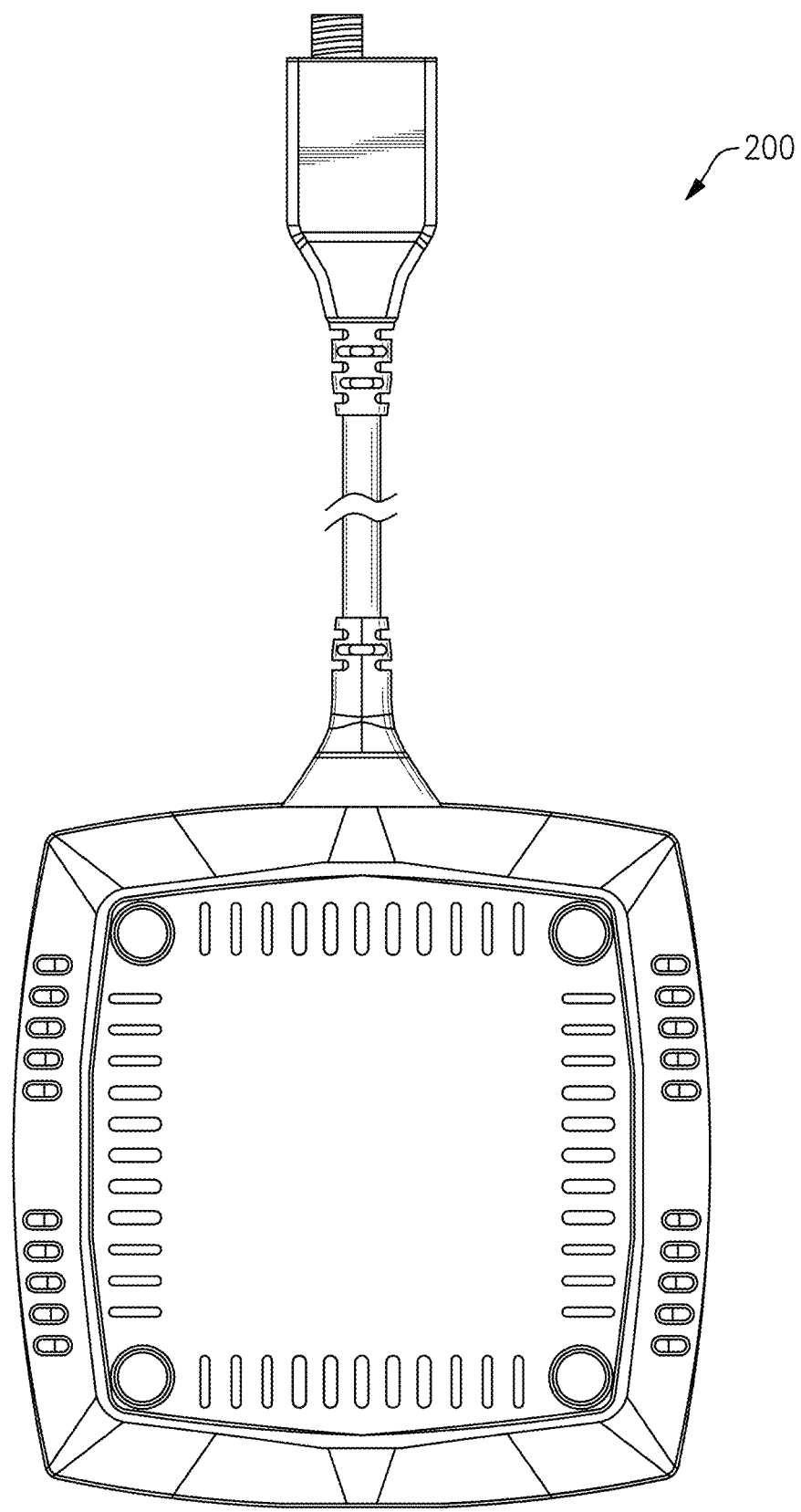
FIG. 5E is a bottom view of the desktop signal booster FIG. 5A.
Figure 6:
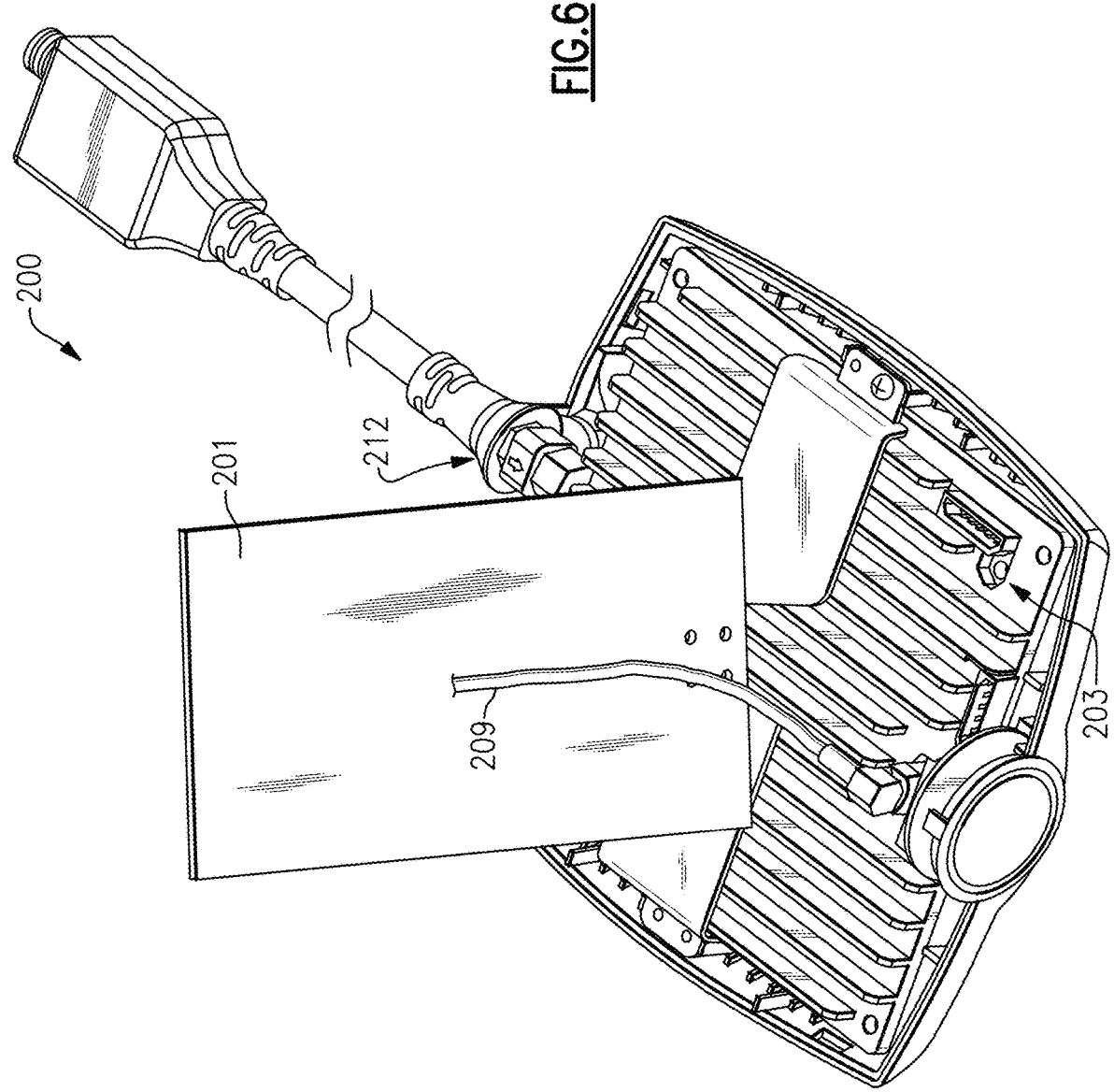
FIG. 6 is a perspective view of the desktop signal booster of FIG. 5A.
Figure 7A:
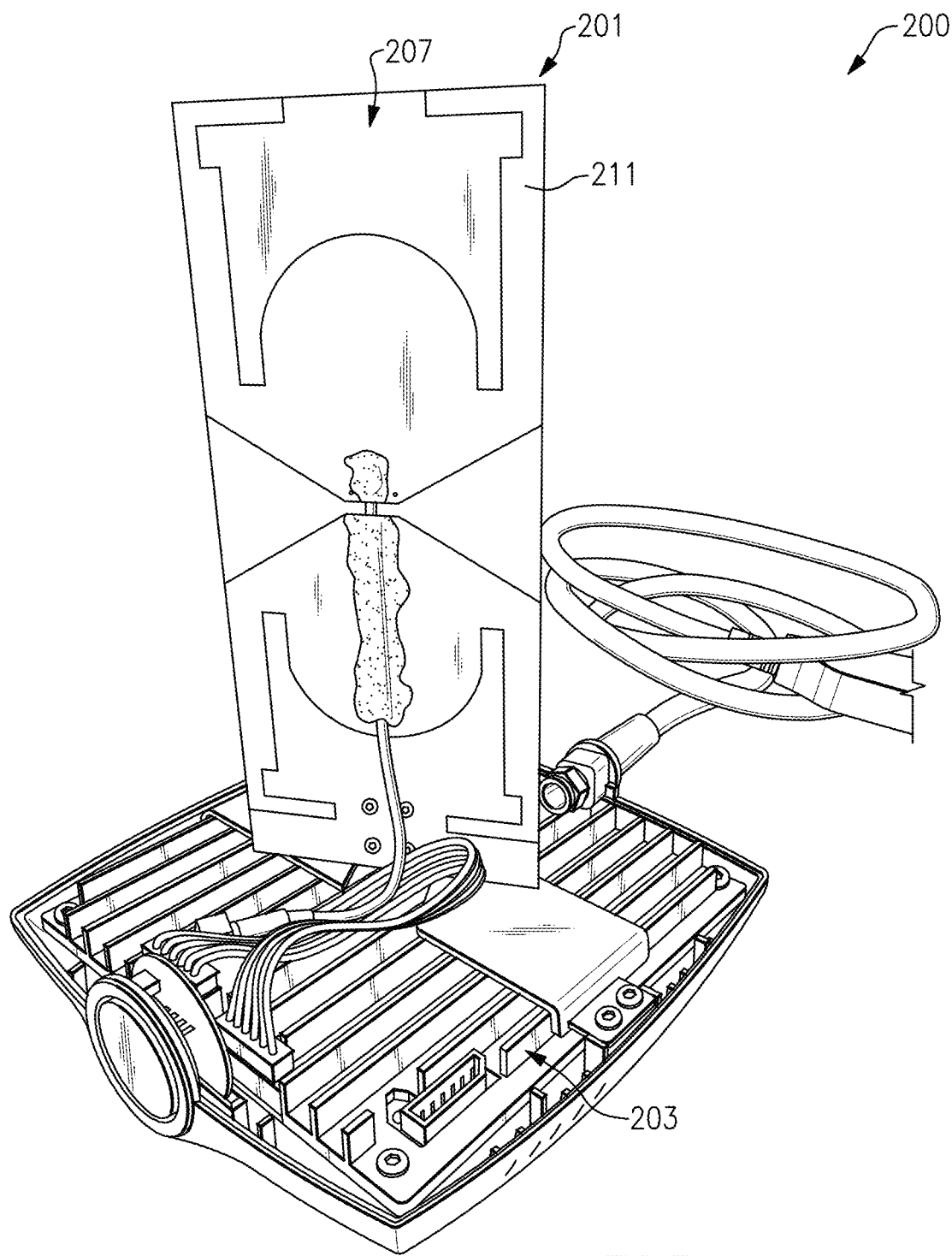
FIG. 7A is an interior front view of the desktop signal booster of FIG. 5A.
Figure 7B:
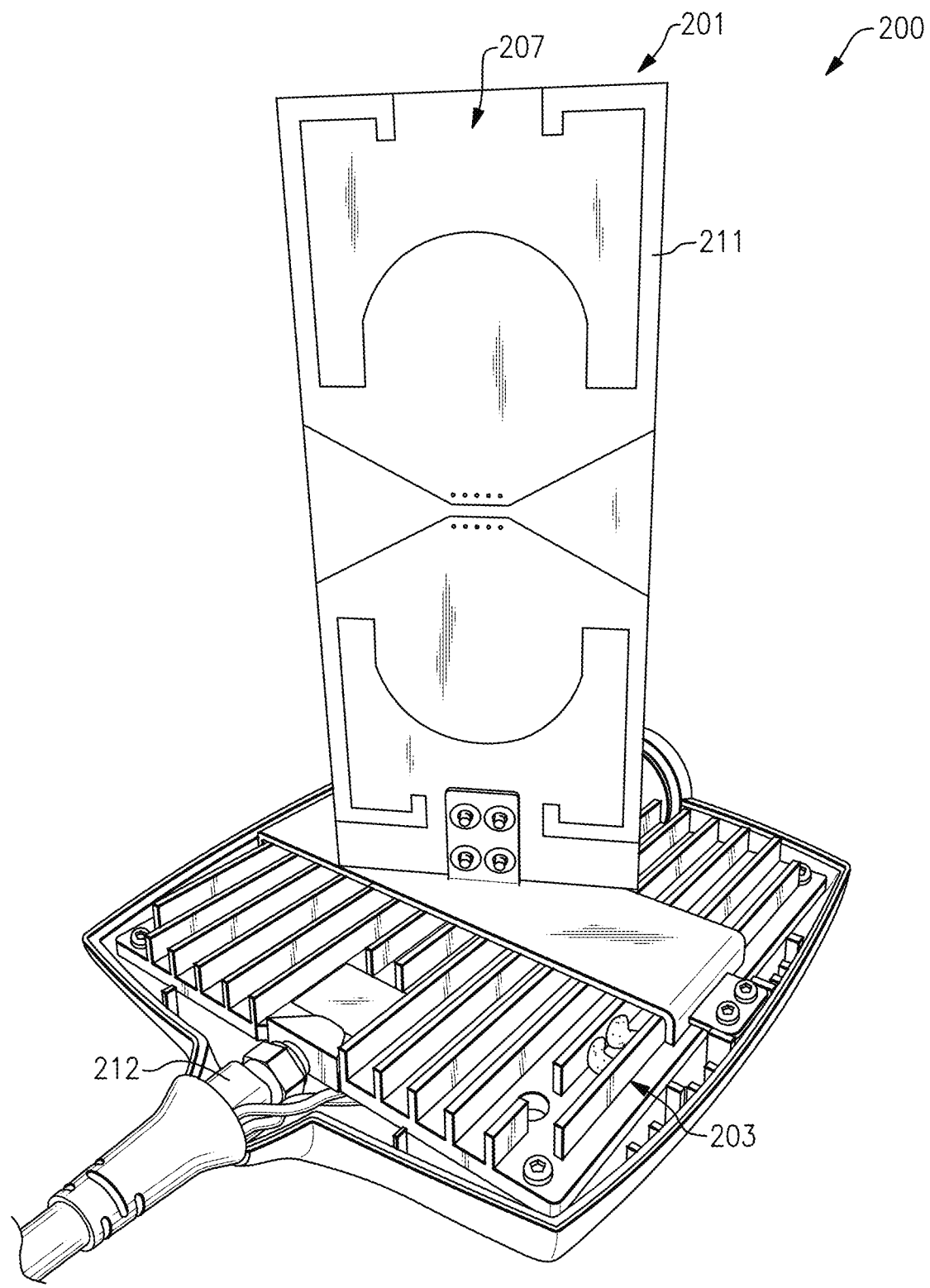
FIG. 7B is an interior rear view of the desktop signal booster of FIG. 5A.
Figure 8:
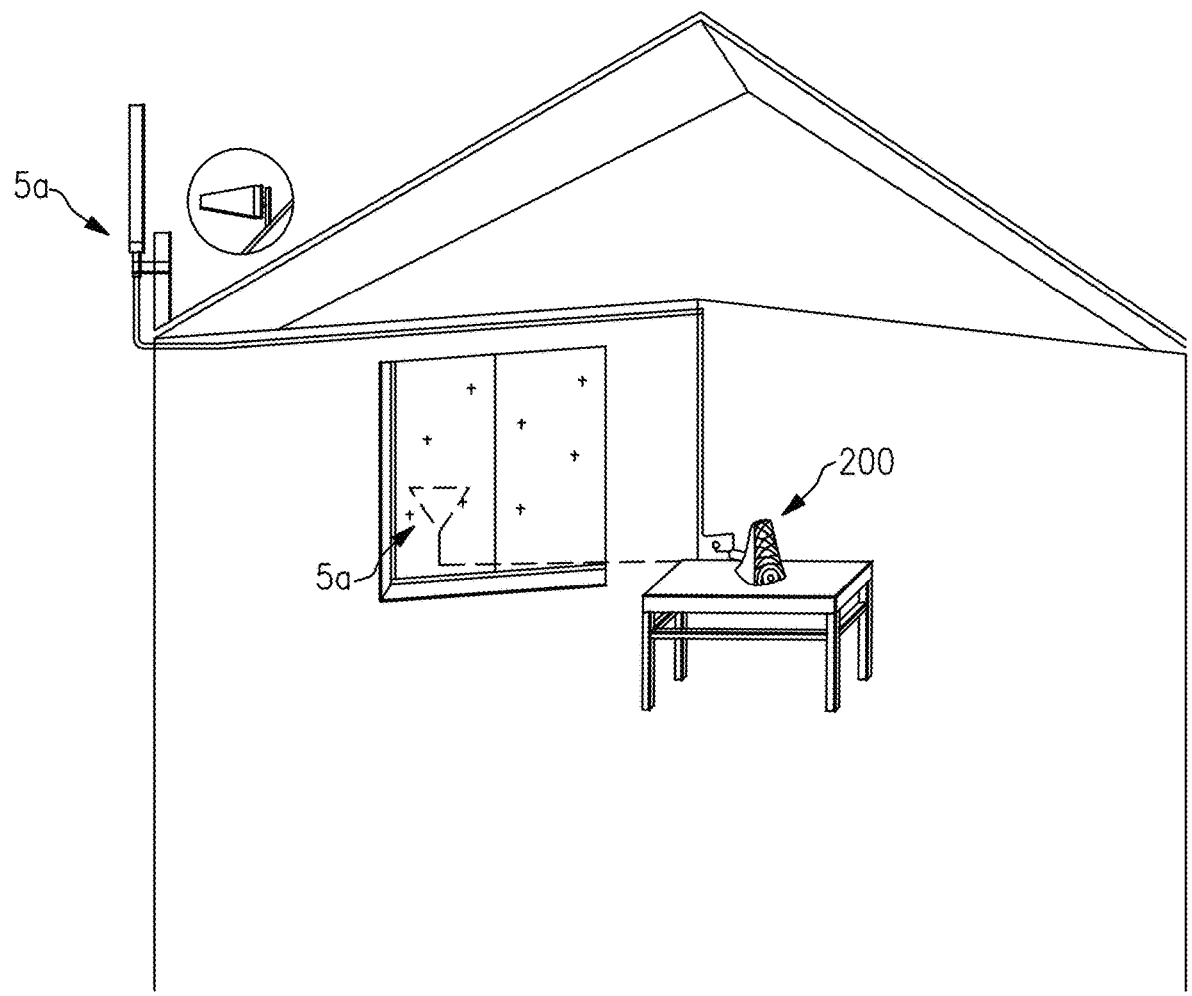
FIG. 8 illustrates an example configuration of the desktop signal booster of FIG. 5A, according to certain embodiments.

FIG. 5A is a front view of the desktop signal booster 200. FIG. 5B is a right-side view of the signal booster 200. FIG. 5C is a left-side view of the desktop signal booster 200. FIG. 5D is a top view of the desktop signal booster 200. FIG. 5E is a bottom view of the desktop signal booster 200. FIG. 6 is a perspective view of the desktop signal booster 200 with a cover removed. FIG. 7A is an interior front view of the desktop signal booster 200. FIG. 7B is an interior rear view of the desktop signal booster 200. FIG. 8 illustrates an example configuration of the desktop signal booster 200, according to certain embodiments.

Although the desktop signal booster 200 of FIGS. 5A-7B is described herein with reference to particular components arranged in a particular configuration, in various embodiments, components herein can be combined, divided, arranged in a different order, or omitted, and additional components can be added.

As shown in FIGS. 6-7B, a mobile station antenna 201 may be included as part of and/or within a portion of the desktop signal booster 200. The mobile station antenna 201 may be rotated with respect to a base portion 205 of the booster, in which the amplifier or signal booster circuitry may be located. For example, a circuit board that includes the mobile station antenna 201 is angled with respect to the sides of the housing and the sides of a circuit board (which may be located beneath a heat sink 203 and connected to the antenna 201 via a cable 209) that includes the signal booster circuitry. In one embodiment, a circuit board including the mobile station antenna 201 is substantially perpendicular with respect to the base portion 205, which can aid in enhancing isolation between the mobile station antenna 201 and circuitry in the base portion 205. The mobile station antenna 201 may also be additionally or alternatively rotated with respect to a cable port 212 for receiving RF signals and/or power, which can enhance isolation.

As illustrated in FIGS. 5B-5D, a portion of the housing 202 at least partially enclosing the antenna 201 may have a curved surface that may have an identical or substantially similar rotation as the antenna 201 enabling the structure to match or mate with a portion of the structure 205 encompassing the heatsink 203 while having a similar or identical rotation as the mobile station antenna 201 at the top of the portion of the housing 202 encompassing the antenna 201. Although not illustrated in FIGS. 5A-7B, the desktop signal booster 200 can include a variety of other components, including, for example, fasteners, connectors, or adhesives used to assemble the desktop signal booster 200. Although one example of a desktop signal booster has been described, the teachings herein are applicable to other configurations of signal boosters. For example, the teachings herein are applicable to configurations using a single PCB, and/or to configurations using a housing of a different form factor.

In some embodiments, the desktop signal booster 200 can include an amplifier unit oriented along a first planar substrate (for example, a PCB). In some embodiments, an axis can be parallel to the first planar substrate. As illustrated in FIG. 5D and FIG. 6, the mobile station antenna 201 may be oriented along a different axis than the amplifier unit, which may be located below the heatsink 203. The amplifier unit may be oriented along the first axis identified in FIG. 5D and the antenna 201 may be oriented along the second axis identified in FIG. 5D. In one embodiment an angle between the first axis and second axis is greater than 0 degrees but less than 90 degrees. Thus, in certain implements, the first axis and the second axis are neither perpendicular nor parallel to one another.

As illustrated in FIG. 7A, the antenna 201 may include an antenna trace 211. This antenna trace 211 may be a conductive material, such as copper, that is attached to a non-conductive substrate 207.

FIG. 8 illustrates an example configuration of the desktop signal booster 200 of FIG. 5A, according to certain embodiments. In the illustrated embodiment, the booster 200 is placed on a desktop within a room, and the base station antenna 5a is mounted on a rooftop. In other embodiments, the base station antenna 5a can be mounted elsewhere, such as in or on a window as shown in the alternative embodiment of FIG. 8 illustrated by dashed lines. In various embodiments, the base station antenna can be an omnidirectional or directional antenna.

Figure 9:
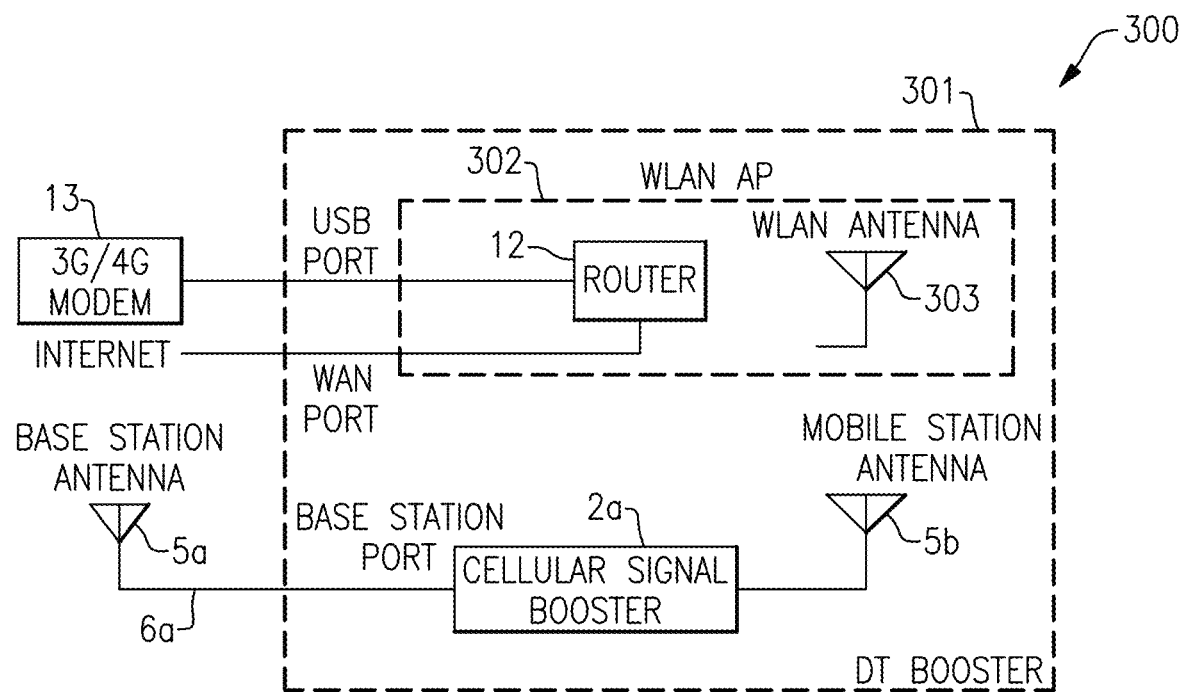
FIG. 9 is a schematic diagram of an integrated signal booster system according to certain embodiments.

FIG. 9 is a schematic diagram of an integrated signal booster system 300 according to certain embodiments. The integrated signal booster system 300 of FIG. 9 is similar to the integrated signal booster system of FIG. 1G, except that the integrated signal booster system 300 of FIG. 9 omits a combiner for combining cellular and WLAN signals in favor of including one or more separate WLAN antennas 303 in the WLAN access point 302.

Figure 10:
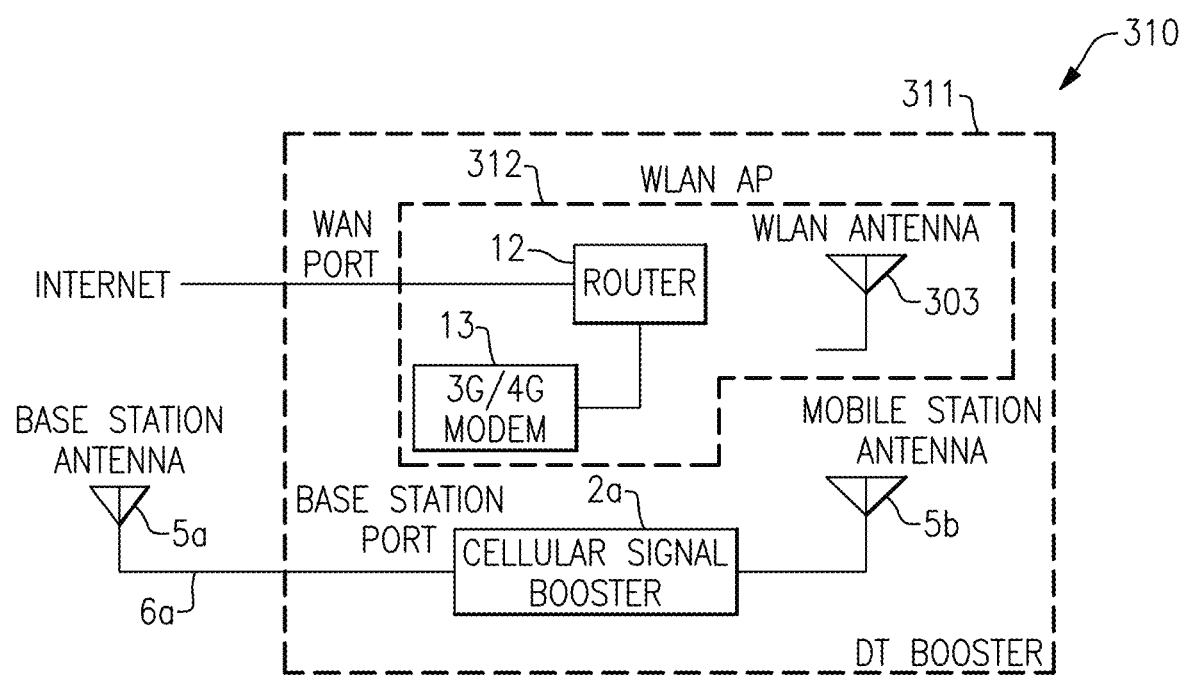
FIG. 10 is a schematic diagram of an integrated signal booster system according to certain embodiments.

FIG. 10 is a schematic diagram of the mobile network according 310 to certain embodiments. The integrated signal booster system 310 of FIG. 10 is similar to the integrated signal booster system 300 of FIG. 9, except that the integrated signal booster system 310 of FIG. 10 includes a WLAN access point 312 that includes the cellular data modem 13.

Figure 11:
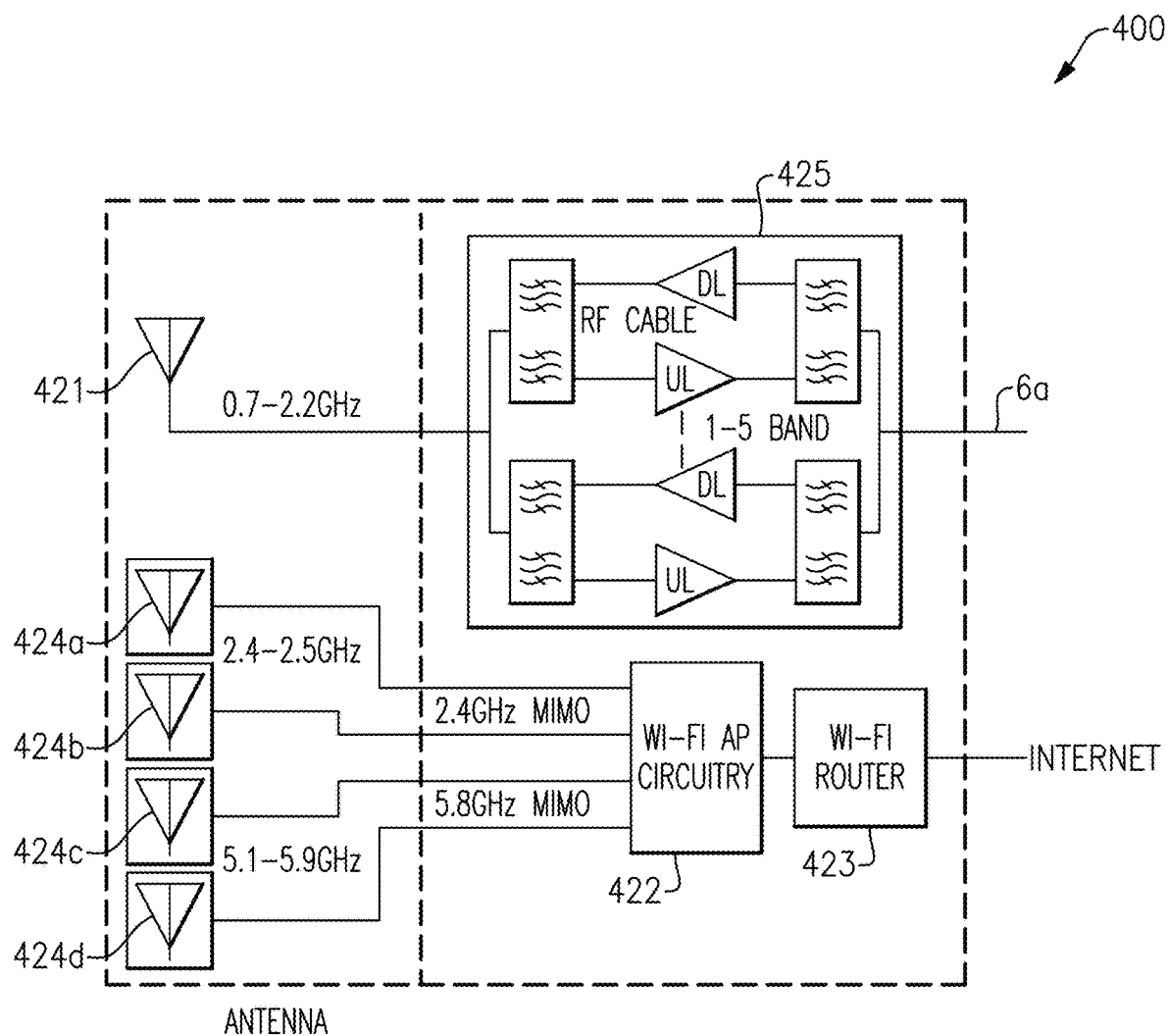
FIG. 11 is a schematic diagram of an integrated signal booster, according to certain embodiments.

FIG. 11 is a schematic diagram of an integrated signal booster 400, according to certain embodiments. The integrated signal booster 400 includes a cellular antenna 421, Wi-Fi AP circuitry 422, Wi-Fi router 423, Wi-Fi antennas 424a-424d, and signal booster circuitry 425. The illustrated embodiment supports dual band Wi-Fi in which each Wi-Fi band operates with two spatial streams to provide diversity. For example, Wi-Fi antennas 424a and 424b operate to transmit and receive two low band Wi-Fi data streams to provide low band Wi-Fi MIMO. Additionally, Wi-Fi antennas 424c and 424d operate to transmit and receive two high band Wi-Fi data streams to provide high band Wi-Fi MIMO.

In certain implementations, the Wi-Fi AP circuitry 422 includes at least one of a data exchange circuit, a power amplifier, a low noise amplifier, or a switch. The switch may facilitate selection of one or more of the Wi-Fi antennas 424a-424d based at least in part on a selected communication band.

The signal booster circuitry 425 receives a cellular uplink signal from the cellular antenna 421, and amplifies one or more uplink channels of the cellular uplink signal to generate a boosted cellular uplink signal for transmission via an RF cable 6a. The signal booster circuitry 425 further receives a cellular downlink signal from the RF cable 6a, and amplifies one or more downlink channels of the cellular downlink signal to generate a boosted cellular downlink signal for transmission via the cellular antenna 421.

The integrated signal booster 400 includes a WLAN access point for providing wireless clients with access to a WLAN network, such as a Wi-Fi network. The integrated signal booster 400 further includes a cellular antenna for communicating with UE of a cellular network.

Although one embodiment of an integrated signal booster 400 is shown in FIG. 11, the teachings herein are applicable to integrated signal boosters and integrated units implemented in a wide variety of ways.

Figure 12:
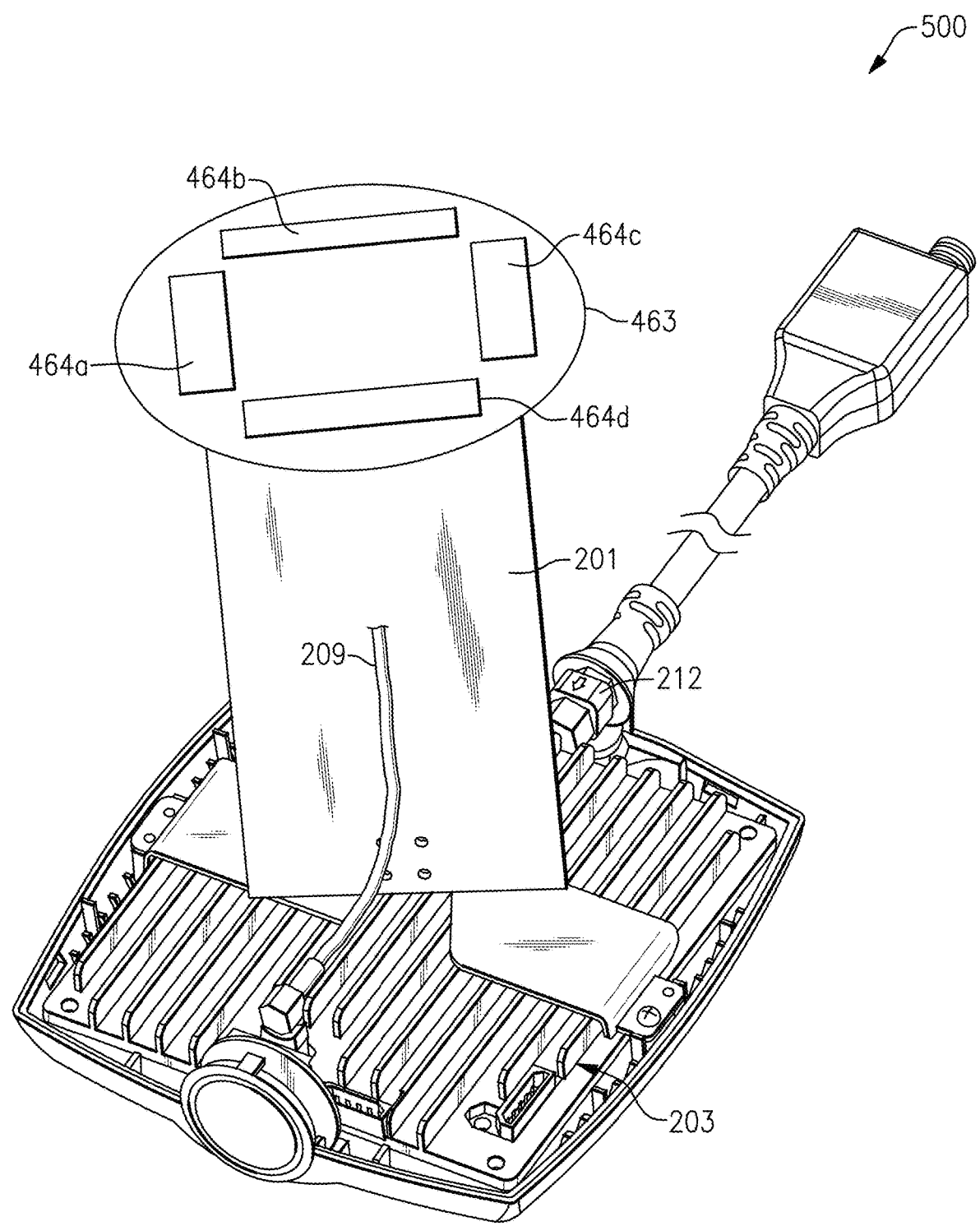
FIG. 12 is a perspective of a desktop signal booster with a cover removed, according to certain embodiments.

FIG. 12 is a perspective view of an integrated signal booster 500 with a cover removed, according to certain embodiments. The integrated signal booster 500 is similar to the integrated signal booster 500 of FIGS. 5A-7B, except that the integrated signal booster 500 further includes an antenna board 463 positioned over the mobile station antenna 201, and WLAN AP circuitry and router circuitry on the circuit board beneath the heat sink 203. In some embodiments, a shielding structure may exist between the WLAN AP circuitry and one or more antennas of the booster 500. In some implementations, the heat sink 203 may serve as the shielding structure.

As shown in FIG. 12, the antenna board 463 is positioned over the mobile station antenna 201, and includes Wi-Fi antennas 464a-464d. In certain implementations, the Wi-Fi antennas 464a-464d provide different wireless communication bands. For example, a low band Wi-Fi MIMO (such as 2.4 GHz) and a high band Wi-Fi MIMO (such as 5.8 GHz) wireless communication band may be provided.

In the illustrated embodiment, the circuit board of the mobile station antenna 201 is substantially perpendicular to the booster's base (for instance, to the heat sink 203 and the circuitry beneath the heat sink 203). Additionally, the antenna board 456 of the Wi-Fi antennas 464a-464d is substantially perpendicular to the circuit board of the mobile station antenna 201. Implementing the integrated signal booster 500 in this manner enhances isolation of the antennas from one another and between the antennas and circuitry beneath the heat sink 203.

Although one embodiment of integrated signal booster 500 is shown in FIG. 12, the teachings herein are applicable to integrated signal boosters and units implemented in a wide variety of ways. For instance, integrated signal boosters can be implemented with housings of different shapes and/or sizes, with cellular and/or WLAN antennas of different numbers and/or types (for instance, omnidirectional, directional, and the like), with different implementations of circuitry, with different implementations of wiring, and/or in a wide variety of other ways.

In the illustrated embodiment, the integrated signal booster 500 receives a combined cable at a port 212. The combined cable may provide a DC supply voltage, a wired network connection (such as an Internet connection), and a connection for communicating RF signals with a base station antenna.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency signal booster comprising:
a housing;
a base station antenna port oriented in a first axis along which signals are primarily conducted, the base station antenna port configured to be connected to a base station antenna configured to receive wireless communications signals on one or more downlink channels and to transmit wireless communications signals on one or more uplink channels;

a mobile station antenna integrated with or located within the housing, the mobile station antenna is oriented along a planar substrate in a second axis differing from the first axis, wherein the first axis and the second axis are non-orthogonal to each other; and an amplifier unit within the housing comprising:
  a downlink amplifier configured to amplify first signals on the one or more downlink channels for transmission through the mobile station antenna, the first signals received at the base station antenna port; and
  an uplink amplifier configured to amplify second signals on uplink channels for transmission through the base station antenna port, the second signals received at the mobile station antenna.

2. The radio frequency signal booster of claim 1, further comprising wireless access point circuitry located within the housing and configured to control wireless communication with one or more wireless devices.

3. The radio frequency signal booster of claim 2, wherein the wireless access point circuitry comprises a data exchange circuit, a power amplifier, a low noise amplifier, and a switch.

4. The radio frequency signal booster of claim 2, further comprising a shielding structure positioned between the wireless access point circuitry and at least one of the base station antenna or the mobile station antenna.

5. The radio frequency signal booster of claim 4, wherein the shielding structure is configured to operate as a heat sink.

6. The radio frequency signal booster of claim 1, further comprising an integrated cellular modem within the housing that is operable to receive an Internet connection.

7. The radio frequency signal booster of claim 1, further comprising a combiner within the housing, wherein the combiner is operable to combine a cellular signal and a wireless local area network signal.

8. The radio frequency signal booster of claim 1, further comprising wireless local area network access point circuitry and a router in communication with the wireless local area network access point circuitry.

9. The radio frequency signal booster of claim 1, further comprising wireless access point circuitry and a heat sink configured to act as a shielding structure, the heat sink positioned between the wireless access point circuitry and at least one of the base station antenna or the mobile station antenna.

10. The radio frequency signal booster of claim 1, wherein the mobile station antenna comprises a directional or omnidirectional antenna.

11. A radio frequency signal booster comprising:
a housing;
a base station antenna port oriented in a first axis along which signals are primarily conducted, the base station antenna port configured to be connected to a base station antenna configured to receive wireless communications signals on one or more downlink channels and to transmit wireless communications signals on one or more uplink channels;
a mobile station antenna integrated with or located within the housing, the mobile station antenna is oriented along a planar substrate in a second axis differing from the first axis; and
an amplifier unit within the housing comprising:
  a downlink amplifier configured to amplify first signals on the one or more downlink channels for transmission through the mobile station antenna, the first signals received at the base station antenna port; and
  an uplink amplifier configured to amplify second signals on uplink channels for transmission through the base station antenna port, the second signals received at the mobile station antenna,
wherein the mobile station antenna is substantially perpendicular to the amplifier unit, thereby increasing isolation between the mobile station antenna and the amplifier unit.

12. A radio frequency signal booster comprising:
a housing;
a base station antenna port oriented in a first axis along which signals are primarily conducted, the base station antenna port configured to be connected to a base station antenna configured to receive wireless communications signals on one or more downlink channels and to transmit wireless communications signals on one or more uplink channels;
a mobile station antenna integrated with or located within the housing, the mobile station antenna is oriented along a planar substrate in a second axis differing from the first axis, wherein an angle between the first axis and the second axis is greater than 0 degrees and less than 90 degrees; and
an amplifier unit within the housing comprising:
  a downlink amplifier configured to amplify first signals on the one or more downlink channels for transmission through the mobile station antenna, the first signals received at the base station antenna port; and
  an uplink amplifier configured to amplify second signals on uplink channels for transmission through the base station antenna port, the second signals received at the mobile station antenna.

13. A radio frequency signal booster comprising:
a housing;
a base station antenna port oriented in a first axis along which signals are primarily conducted, the base station antenna port configured to be connected to a base station antenna configured to receive wireless communications signals on one or more downlink channels and to transmit wireless communications signals on one or more uplink channels;
a mobile station antenna integrated with or located within the housing, the mobile station antenna is oriented along a planar substrate in a second axis differing from the first axis;
an amplifier unit within the housing comprising:
  a downlink amplifier configured to amplify first signals on the one or more downlink channels for transmission through the mobile station antenna, the first signals received at the base station antenna port; and
  an uplink amplifier configured to amplify second signals on uplink channels for transmission through the base station antenna port, the second signals received at the mobile station antenna; and
a composite cable configured to be connected to the base station antenna port, the composite cable comprising a power line and a radio frequency cable.

14. A radio frequency signal booster comprising:
a housing;
a base station antenna port oriented in a first axis along which signals are primarily conducted, the base station antenna port configured to be connected to a base station antenna configured to receive wireless communications signals on one or more downlink channels and transmit wireless communications signals on one or more uplink channels;

a mobile station antenna integrated with or located within the housing, the mobile station antenna is oriented along a planar substrate in a second axis differing from the first axis, wherein the first axis is at an angle to the second axis that is not a multiple of 90 degrees; and an amplifier unit within the housing comprising:
- a downlink amplifier configured to amplify first signals on the one or more downlink channels; and
- an uplink amplifier configured to amplify second signals on uplink channels for transmission through the base station antenna port, the second signals received at the mobile station antenna.

15. A radio frequency signal booster comprising:

a housing;

a base station antenna port oriented in a first axis along which signals are primarily conducted, the base station antenna port configured to be connected to a bas station antenna configured to receive wireless communications signals on one or more downlink channels and to transmit wireless communications signals on one or more uplink channels;

a mobile station antenna integrated with or located within the housing, the mobile station antenna is oriented along a planar substrate in a second axis differing from the first axis; and an amplifier unit within the housing comprising:
- a downlink amplifier configured to amplify first signals on the one or more downlink channels for transmission through the mobile station antenna, the first signals received at the base station antenna port; and
- an uplink amplifier configured to amplify second signals on uplink channels for transmission through the base station antenna port, the second signals received at the mobile station antenna, wherein the amplifier unit is oriented along the first axis.

16. The radio frequency signal booster of claim 15, further comprising wireless access point circuitry located within the housing and configured to control wireless communication with one or more wireless devices.

17. The radio frequency signal booster of claim 16, wherein the wireless access point circuitry comprises a data exchange circuit, a power amplifier, a low noise amplifier, and a switch.

18. The radio frequency signal booster of claim 16, further comprising a shielding structure positioned between the wireless access point circuitry and at least one of the base station antenna or the mobile station antenna.

19. The radio frequency signal booster of claim 18, wherein the shielding structure is configured to operate as a heat sink.

20. The radio frequency signal booster of claim 15, further comprising wireless local area network access point circuitry and a router in communication with the wireless local area network access point circuitry.

* * * * *